United States Patent
Liu et al.

(10) Patent No.: US 11,265,741 B2
(45) Date of Patent: Mar. 1, 2022

(54) LINK RE-ESTABLISHMENT METHOD AND DEVICE

(71) Applicant: HUAWEI TECHNOLOGIES CO., LTD., Guangdong (CN)

(72) Inventors: Kunpeng Liu, Beijing (CN); Xueru Li, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/581,553

(22) Filed: Sep. 24, 2019

(65) Prior Publication Data
US 2020/0022004 A1   Jan. 16, 2020

Related U.S. Application Data

(63) Continuation of application No. PCT/CN2018/080346, filed on Mar. 23, 2018.

(30) Foreign Application Priority Data

Mar. 24, 2017   (CN) .......................... 201710184665.6

(51) Int. Cl.
*H04W 24/04* (2009.01)
*H04L 1/00* (2006.01)
(Continued)

(52) U.S. Cl.
CPC .......... *H04W 24/04* (2013.01); *H04L 1/0038* (2013.01); *H04L 1/1671* (2013.01); *H04W 24/06* (2013.01); *H04W 24/10* (2013.01)

(58) Field of Classification Search
CPC ..... H04W 24/04; H04W 24/06; H04W 24/10; H04W 76/19; H04W 16/28;
(Continued)

(56) References Cited

U.S. PATENT DOCUMENTS 10,506,576 B2 * 12/2019 John Wilson ....... H04W 72/042
10,524,244 B2 * 12/2019 Tsai ..................... H04B 7/0617
(Continued)

FOREIGN PATENT DOCUMENTS

| CN | 105308880 A | 2/2016 |
|----|-------------|--------|
| WO | 2016127403 A1 | 8/2016 |
| WO | 2017024516 A1 | 2/2017 |

OTHER PUBLICATIONS

Catt, "Considerations on beam recovery mechanism," 3GPP TSG RAN WG1 Meeting #88, R1-1702078; Athens, Greece, XP051209239, Feb. 13-17, 2017, 4 pages.
(Continued)

Primary Examiner — Jay P Patel
(74) Attorney, Agent, or Firm — Fish & Richardson P.C.

(57) ABSTRACT

Embodiments of the present invention disclose a link re-establishment method and a device, and relate to the communications field: When detecting that a first downlink beam pair set is invalid, UE sends a first uplink signal to a base station at a moment n by using a first uplink beam pair set through a first uplink channel, where the first uplink signal is used to notify the base station that the first downlink beam pair set is invalid; and the UE detects, at a moment n+k, a first downlink signal sent by the base station by using a second downlink beam pair set through a first downlink channel.

10 Claims, 12 Drawing Sheets

(51) Int. Cl.
  *H04L 1/16* (2006.01)
  *H04W 24/06* (2009.01)
  *H04W 24/10* (2009.01)

(58) Field of Classification Search
  CPC .......... H04W 72/0413; H04W 72/042; H04W 72/046; H04L 1/0038; H04L 1/1671; H04L 5/0048
  See application file for complete search history.

(56) References Cited

U.S. PATENT DOCUMENTS

| | | | |
|---|---|---|---|
| 10,547,429 B2* | 1/2020 | John Wilson | H04L 5/0091 |
| 10,638,484 B2* | 4/2020 | Seo | H04L 25/022 |
| 2013/0039345 A1 | 2/2013 | Kim et al. | |
| 2016/0150435 A1 | 5/2016 | Baek et al. | |
| 2017/0332359 A1* | 11/2017 | Tsai | H04B 7/0639 |
| 2018/0220398 A1* | 8/2018 | John Wilson | H04B 7/0695 |
| 2018/0227887 A1* | 8/2018 | Hakola | H04B 7/022 |
| 2019/0081740 A1* | 3/2019 | Kaikkonen | H04W 72/0446 |
| 2019/0306847 A1* | 10/2019 | Seo | H04L 25/022 |
| 2019/0349915 A1* | 11/2019 | Ahn | H04B 7/0695 |
| 2019/0349960 A1* | 11/2019 | Li | H04L 1/1812 |
| 2020/0099437 A1* | 3/2020 | Harada | H04L 5/0053 |
| 2020/0100219 A1* | 3/2020 | Takeda | H04L 5/0053 |
| 2020/0112993 A1* | 4/2020 | Tsai | H04W 72/042 |
| 2020/0119839 A1* | 4/2020 | Jo | H04B 7/06 |
| 2020/0389220 A1* | 12/2020 | Kang | H04B 7/0695 |
| 2021/0120574 A1* | 4/2021 | Takeda | H04W 72/042 |
| 2021/0136768 A1* | 5/2021 | Kang | H04W 72/0466 |

OTHER PUBLICATIONS

Extended European Search Report issued in European Application No. 18770513.25 dated Feb. 25, 2020, 9 pages.
Huawei et al., "Link recovery procedure for beam failure," 3GPP TSG RAN WG1 Meeting #88b, R1-1704230; Spokane, USA, Apr. 3-7, 2017, 7 pages.
Huawei et al., "Procedure Details for Beam Failure Recovery," 3GPP TSG RAN WG1 Meeting #90, R1-1712224, Prague, Czech Republic, XP051315041, Aug. 21-25, 2017, 12 pages.
Huawei et al., "General views on beam failure recovery," 3GPP TSG RAN WG1 NR Ad Hoc Meeting, R1-1709929; Qingdao, China, XP051299154, Jun. 27-30, 2017, 8 pages.
Mediatek Inc, "Aspects for UE-initiated beam recovery," 3GPP TSG RAN WG1 Meeting #88, R1-1702730; Athens, Greece, XP051209877, Feb. 13-17, 2017, 6 pages.
PCT International Search Report and Written Opinion issued in International Application No. PCT/CN2018/080346 dated Jun. 7, 2018, 15 pages (with English translation).
Guangdong OPPO Mobile Telecom, "On Beam Recovery Mechanism," 3GPP TSG RAN WG1 Meeting #88, R1-1701944, Athens, Greece Feb. 13-17, 2017, 4 pages.
LG Electronics, "Discussion on beam setting for control channel and data channel," 3GPP TSG RAN WG1 Meeting #88, R1-1702452, Athens, Greece Feb. 13-17, 2017, 5 pages.
NTT Docomo, Inc., "Views on mechanism to recover from beam failure," 3GPP TSG RAN WG1 Meeting #88, R1-1702799, Athens, Greece Feb. 13-17, 2017, 4 pages.
Office Action issued in Japanese Application No. 2019-552597 dated Dec. 22, 2021, 6 pages (with English translation).
Office Action issued in Chinese Application No. 201880018538.1 dated Mar. 29, 2021, 14 pages.

* cited by examiner

LINK RE-ESTABLISHMENT METHOD AND DEVICE

CROSS-REFERENCE TO RELATED APPLICATIONS

This application is a continuation of International Application No. PCT/CN2018/080346, filed on Mar. 23, 2018, which claims priority to Chinese Patent Application No. 201710184665.6, filed on Mar. 24, 2017, The disclosures of the aforementioned applications are hereby incorporated by reference in their entireties.

TECHNICAL FIELD

Embodiments of the present invention relate to the communications field, and in particular, to a link re-establishment method and a device.

BACKGROUND

With continuous development of communications technologies and mobile bandwidth services, a fifth generation mobile communications technology (fifth Generation, 5G) system emerges. Because there is a large quantity of bandwidth resources at a high frequency, a high frequency may be used as a working frequency in the 5G system. However, because a transmission loss at a high frequency is relatively large compared with that at a low frequency, a beamforming technology may be used. To be specific, a plurality of antenna modules integrated into a transceiver are used to form an array, to implement a directional beam, to improve an antenna gain and received signal power of the transceiver, thereby overcoming the transmission loss at the high frequency.

It is well known that in a communications system in which the beamforming technology is used, because a width of a receive beam and that of a transmit beam both are relatively narrow, in order that user equipment (User Equipment, UE) can normally access a base station and can maintain stable communication with the base station, the UE and the base station each need to perform a beam training process. For example, the base station needs to sequentially send reference signals to the UE by using different transmit beams. For each transmit beam, the UE needs to sequentially traverse all receive beams, to measure reference information sent by the base station by using the transmit beam, so that the UE can select one or more groups of better downlink beam pairs, and reports information about the selected downlink beam pair to the base station. Likewise, the UE also needs to sequentially send reference signals to the base station by using different transmit beams. For each transmit beam, the base station needs to sequentially traverse all receive beams, to measure reference information sent by the UE by using the transmit beam, so that the base station can select one or more groups of better uplink beam pairs, and reports information about the selected uplink beam pair to the UE.

It may be learned from the above that through the beam training process, both the base station and the UE can obtain one or more groups of uplink beam pairs and downlink beam pairs that are used to communicate with each other. In this way, in a subsequent communication process, the base station and the UE can transmit data to each other by using the determined uplink beam pair and downlink beam pair. However, because a block may exist in a process of communication between the base station and the UE and a diffraction capability at a high frequency is poor, a beam used for communication between the base station and the UE is blocked. As a result, data cannot continue to be transmitted, and consequently communication is interrupted.

SUMMARY

Embodiments of the present invention provide a link re-establishment method and a device, to resolve a problem that communication is interrupted in a process of communication between a base station and UE because data cannot continue to be transmitted due to a block.

To achieve the foregoing objective, the following technical solutions are used in the embodiments of the present invention:

A first aspect of the embodiments of the present invention provides a link re-establishment method, including:

sending, by UE when detecting that a first downlink beam pair set is invalid, a first uplink signal to a base station at a moment n by using a first uplink beam pair set through a first uplink channel, where the first uplink signal is used to notify the base station that the first downlink beam pair set is invalid; and detecting, by the UE at a moment n+k, a first downlink signal sent by the base station by using a second downlink beam pair set through a first downlink channel, to obtain a first detection result, where the first downlink signal is used to acknowledge that the base station receives the first uplink signal.

In the link re-establishment method provided in the embodiments of the present invention, when detecting that the first downlink beam pair set is invalid, the UE sends, to the base station at the moment n by using the first uplink beam pair set through the first uplink channel, the first uplink signal used to notify the base station that the first downlink beam pair set is invalid; and detects, at the moment n+k, the first downlink signal sent by the base station by using the second downlink beam pair set through the first downlink channel, to obtain the first detection result, where the first downlink signal is used to acknowledge that the base station receives the first uplink signal. The UE sends, to the base station, the first uplink signal used to notify the base station that the first downlink beam pair set is invalid, so that the base station can send the first downlink signal by using the second downlink beam pair set through the first downlink channel. In this way, a link can be recovered through negotiation between the base station and the UE, to resolve a problem that communication is interrupted in a process of communication between the base station and the UE because data cannot continue to be transmitted due to a block.

With reference to the first aspect, in a possible implementation, the first downlink signal is determined based on content included in the first uplink signal.

With reference to the first aspect and the foregoing possible implementation, in another possible implementation, the first uplink signal is a beam failure report or a beam recovery request, and the first downlink signal is a downlink control channel (NR-PDCCH) or a first measurement pilot; and the detecting, by the UE at a moment n+k, a first downlink signal sent by the base station by using a second downlink beam pair set through a first downlink channel, to obtain a first measurement result includes: performing, by the UE, blind detection on the downlink control channel at the moment n+k based on the second downlink beam pair set, to obtain the first measurement result, where the second downlink beam pair set is a preconfigured beam pair set used for beam recovery, and the second downlink beam pair set is different from the first downlink beam pair set.

With reference to the first aspect and the foregoing possible implementations, in another possible implementation, when the first downlink signal is the downlink control channel, the downlink control channel includes configuration information of the first measurement pilot; or when the first downlink signal is the first measurement pilot, configuration information of the first measurement pilot is preconfigured in the UE; and the performing, by the UE, blind detection on the downlink control channel at the moment n+k based on the second downlink beam pair set, to obtain the first measurement result includes: measuring, by the UE, the first measurement pilot based on the configuration information of the first measurement pilot, to obtain the first detection result, where the first measurement pilot is a beam measurement pilot, and the first measurement result is information about a target downlink beam pair set.

With reference to the first aspect and the foregoing possible implementations, in another possible implementation, the first uplink signal is a beam failure report or a beam recovery request, and the first downlink signal is a downlink control channel NR-PDCCH; and the detecting, by the UE at a moment n+k, a first downlink signal sent by the base station by using a second downlink beam pair set through a first downlink channel, to obtain a first measurement result includes: obtaining, by the UE, the first measurement result at the moment n+k based on detection on the downlink control channel, where the first measurement result is information about a target downlink beam pair set.

With reference to the first aspect and the foregoing possible implementations, in another possible implementation, the downlink control channel further includes uplink resource information used to report the first measurement result, and the uplink resource information includes an uplink time-frequency resource and/or information about a second uplink beam pair set; and after the detecting, by the UE at a moment n+k, a first downlink signal sent by the base station by using a second downlink beam pair set through a first downlink channel, to obtain a first measurement result, the method further includes: sending, by the UE, the first measurement result to the base station at a moment n+k+k1 based on the uplink resource information.

With reference to the first aspect and the foregoing possible implementations, in another possible implementation, after the sending, by the UE, the first measurement result to the base station at a moment n+k+k1 based on the uplink resource information, the method further includes: detecting, by the UE, a third downlink channel at a moment n+k+k1+k2, to obtain information about a third downlink beam pair set; and communicating, by the UE, with the base station based on the information about the third downlink beam pair set.

With reference to the first aspect and the foregoing possible implementations, in another possible implementation, the detecting, by the UE, a third downlink channel at a moment n+k+k1+k2, to obtain information about a third downlink beam pair set includes: performing, by the UE, blind detection on the third downlink channel at the moment n+k+k1+k2 based on N optimal target downlink beam pairs in the target downlink beam pair set in the first measurement result, to obtain the information about the third downlink beam pair set.

With reference to the first aspect and the foregoing possible implementations, in another possible implementation, the first uplink signal is a beam failure report or a beam recovery request, the first uplink signal includes information about a first target downlink beam pair set, and the second downlink beam pair set is the first target downlink beam pair set; the first downlink signal is a downlink control channel NR-PDCCH or a first measurement pilot; and the detecting, by the UE at a moment n+k, a first downlink signal sent by the base station by using a second downlink beam pair set through a first downlink channel, to obtain a first measurement result includes: performing, by the UE, blind detection on the downlink control channel at the moment n+k based on the first target downlink beam pair set, to obtain the first measurement result, where the first target downlink beam pair set is different from the first downlink beam pair set.

With reference to the first aspect and the foregoing possible implementations, in another possible implementation, when the first downlink signal is the downlink control channel, the downlink control channel includes configuration information of the first measurement pilot; or when the first downlink signal is the first measurement pilot, configuration information of the first measurement pilot is preconfigured in the UE; and the performing, by the UE, blind detection on the downlink control channel at the moment n+k based on the first target downlink beam pair set, to obtain the first measurement result includes: measuring, by the UE, the first measurement pilot based on the configuration information of the first measurement pilot, to obtain the first detection result, where the first measurement pilot is a beam measurement pilot, and the first measurement result is information about a second target downlink beam pair set.

With reference to the first aspect and the foregoing possible implementations, in another possible implementation, the first uplink signal is a beam failure report or a beam recovery request, the first uplink signal includes information about a first target downlink beam pair set, and the second downlink beam pair set is the first target downlink beam pair set; the first downlink signal is a downlink control channel NR-PDCCH; and the detecting, by the UE at a moment n+k, a first downlink signal sent by the base station by using a second downlink beam pair set through a first downlink channel, to obtain a first measurement result includes: obtaining, by the UE, the first measurement result at the moment n+k based on detection on the downlink control channel, where the first measurement result is information about a second target downlink beam pair set.

With reference to the first aspect and the foregoing possible implementations, in another possible implementation, the first downlink signal includes information about a third downlink beam pair set; and after the detecting, by the UE at a moment n+k, a first downlink signal sent by the base station by using a second downlink beam pair set through a first downlink channel, to obtain a first detection result, the method further includes: communicating, by the UE, with the base station based on the information about the third downlink beam pair set.

With reference to the first aspect and the foregoing possible implementations, in another possible implementation, the first downlink signal further includes information about a target uplink beam pair set.

With reference to the first aspect and the foregoing possible implementations, in another possible implementation, the first uplink signal is a beam failure report or a beam recovery request; and after the sending, by user equipment UE when detecting that a first downlink beam pair set is invalid, a first uplink signal to a base station at a moment n by using a first uplink beam pair set through a first uplink channel, the method further includes: determining, by the UE, that the first downlink signal is not detected at the moment n+k; and resending, by the UE, the first uplink signal to the base station at a moment n+k+k1 by using a second uplink beam pair set through a second uplink channel.

With reference to the first aspect and the foregoing possible implementations, in another possible implementation, the first uplink signal is a beam failure report or a beam recovery request; and after the sending, by user equipment UE when detecting that a first downlink beam pair set is invalid, a first uplink signal to a base station at a moment n by using a first uplink beam pair set through a first uplink channel, the method further includes: determining, by the UE, that the first downlink signal is not detected at the moment n+k; and resending, by the UE, the first uplink signal to the base station at a moment n+k+k1 by using the first uplink beam pair set through the first uplink channel, where transmit power used to send the first uplink signal at the moment n+k+k1 is increased by X compared with transmit power at which the first uplink signal is sent at the moment n, and X is a preset power value.

With reference to the first aspect and the foregoing possible implementations, in another possible implementation, the method further includes: detecting, by the UE at a moment n+k+k1+k2, the first downlink signal sent by the base station by using the second downlink beam pair set through the first downlink channel, to obtain the first detection result.

With reference to the first aspect and the foregoing possible implementations, in another possible implementation, the first downlink signal is a downlink control channel NR-PDCCH or a first measurement pilot; and the detecting, by the UE at a moment n+k+k1+k2, the first downlink signal sent by the base station by using the second downlink beam pair set through the first downlink channel, to obtain the first measurement result includes: performing, by the UE, blind detection on the downlink control channel at the moment n+k+k1+k2 based on the second downlink beam pair set, to obtain the first measurement result, where the second downlink beam pair set is a preconfigured beam pair set used for beam recovery, the second downlink beam pair set is different from the first downlink beam pair set, the first downlink signal includes information that is about a target uplink beam pair set and that is indicated to the UE, and the information about the target uplink beam pair set is obtained based on the second uplink beam pair set.

With reference to the first aspect and the foregoing possible implementations, in another possible implementation, when the first downlink signal is the downlink control channel, the downlink control channel includes configuration information of the first measurement pilot; or when the first downlink signal is the first measurement pilot, configuration information of the first measurement pilot is preconfigured in the UE; and the performing, by the UE, blind detection on the downlink control channel at the moment n+k+k1+k2 based on the second downlink beam pair set, to obtain the first measurement result includes: measuring, by the UE, the first measurement pilot based on the configuration information of the first measurement pilot, to obtain the first detection result, where the first measurement pilot is a beam measurement pilot, and the first measurement result is information about a target downlink beam pair set.

With reference to the first aspect and the foregoing possible implementations, in another possible implementation, the first downlink signal is a downlink control channel NR-PDCCH; and the detecting, by the UE at a moment n+k+k1+k2, the first downlink signal sent by the base station by using the second downlink beam pair set through the first downlink channel, to obtain the first measurement result includes: obtaining, by the UE, the first measurement result at the moment n+k+k1+k2 based on detection on the downlink control channel, where the first measurement result is information about a target downlink beam pair set.

With reference to the first aspect and the foregoing possible implementations, in another possible implementation, the downlink control channel further includes uplink resource information used to report the first measurement result, and the uplink resource information includes an uplink time-frequency resource and/or information about a third uplink beam pair set; and after the detecting, by the UE at a moment n+k+k1+k2, the first downlink signal sent by the base station by using the second downlink beam pair set through the first downlink channel, to obtain the first measurement result, the method further includes: sending, by the UE, the first measurement result to the base station at a moment n+k+k1+k2+k3 based on the uplink resource information.

With reference to the first aspect and the foregoing possible implementations, in another possible implementation, after the sending, by the UE, the first measurement result to the base station at a moment n+k+k1+k2+k3 based on the uplink resource information, the method further includes: detecting, by the UE, a third downlink channel at a moment n+k+k1+k2+k3+k4, to obtain information about a third downlink beam pair set; and communicating, by the UE, with the base station based on the information about the third downlink beam pair set.

With reference to the first aspect and the foregoing possible implementations, in another possible implementation, the detecting, by the UE, a third downlink channel at a moment n+k+k1+k2+k3+k4, to obtain information about a third downlink beam pair set includes: performing, by the UE, blind detection on the third downlink channel at the moment n+k+k1+k2+k3+k4 based on N optimal target downlink beam pairs in the target downlink beam pair set in the first measurement result, to obtain the information about the third downlink beam pair set.

With reference to the first aspect and the foregoing possible implementations, in another possible implementation, the first uplink signal is a beam failure report or a beam recovery request, the first uplink signal includes information about a first target downlink beam pair set, and the second downlink beam pair set is the first target downlink beam pair set; and after the sending, by user equipment UE when detecting that a first downlink beam pair set is invalid, a first uplink signal to a base station at a moment n by using a first uplink beam pair set through a first uplink channel, the method further includes: determining, by the UE, that the first downlink signal is not detected at the moment n+k; and resending, by the UE, the first uplink signal to the base station at a moment n+k+k1 by using a second uplink beam pair set through a second uplink channel.

With reference to the first aspect and the foregoing possible implementations, in another possible implementation, the first uplink signal is a beam failure report or a beam recovery request; and after the sending, by user equipment UE when detecting that a first downlink beam pair set is invalid, a first uplink signal to a base station at a moment n by using a first uplink beam pair set through a first uplink channel, the method further includes: determining, by the UE, that the first downlink signal is not detected at the moment n+k; and resending, by the UE, the first uplink signal to the base station at a moment n+k+k1 by using the first uplink beam pair set through the first uplink channel, where transmit power used to send the first uplink signal at the moment n+k+k1 is increased by X compared with transmit power at which the first uplink signal is sent at the moment n, and X is a preset power value.

With reference to the first aspect and the foregoing possible implementations, in another possible implementation, the method further includes: detecting, by the UE at a moment n+k+k1+k2, the first downlink signal sent by the base station by using the first target downlink beam pair set through the first downlink channel, to obtain the first detection result.

With reference to the first aspect and the foregoing possible implementations, in another possible implementation, the first downlink signal is a downlink control channel NR-PDCCH or a first measurement pilot; and the detecting, by the UE at a moment n+k+k1+k2, the first downlink signal sent by the base station by using the first target downlink beam pair set through the first downlink channel, to obtain the first measurement result includes: performing, by the UE, blind detection on the downlink control channel at the moment n+k+k1+k2 based on the first target downlink beam pair set, to obtain the first measurement result, where the first target downlink beam pair set is different from the first downlink beam pair set.

With reference to the first aspect and the foregoing possible implementations, in another possible implementation, when the first downlink signal is the downlink control channel, the downlink control channel includes configuration information of the first measurement pilot; or when the first downlink signal is the first measurement pilot, configuration information of the first measurement pilot is preconfigured in the UE; and the performing, by the UE, blind detection on the downlink control channel at the moment n+k+k1+k2 based on the first target downlink beam pair set, to obtain the first measurement result includes: measuring, by the UE, the first measurement pilot based on the configuration information of the first measurement pilot, to obtain the first detection result, where the first measurement pilot is a beam measurement pilot, and the first measurement result is information about a second target downlink beam pair set.

With reference to the first aspect and the foregoing possible implementations, in another possible implementation, the first downlink signal is a downlink control channel NR-PDCCH; and the detecting, by the UE at a moment n+k+k1+k2, the first downlink signal sent by the base station by using the first target downlink beam pair set through the first downlink channel, to obtain the first measurement result includes: obtaining, by the UE, the first measurement result at the moment n+k+k1+k2 based on detection on the downlink control channel, where the first measurement result is information about a second target downlink beam pair set.

With reference to the first aspect and the foregoing possible implementations, in another possible implementation, the first downlink signal includes information about a target uplink beam pair set; and after the detecting, by the UE at a moment n+k+k1+k2, the first downlink signal sent by the base station by using the first target downlink beam pair set through the first downlink channel, to obtain the first measurement result, the method further includes: sending, by the UE, the first measurement result to the base station at a moment n+k+k1+k2+k3 by using the target uplink beam pair set.

With reference to the first aspect and the foregoing possible implementations, in another possible implementation, after the sending, by the UE, the first measurement result to the base station at a moment n+k+k1+k2+k3 by using the target uplink beam pair set, the method further includes: detecting, by the UE, a third downlink channel at a moment n+k+k1+k2+k3+k4, to obtain information about a third downlink beam pair set; and communicating, by the UE, with the base station based on the information about the third downlink beam pair set.

With reference to the first aspect and the foregoing possible implementations, in another possible implementation, the detecting, by the UE, a third downlink channel at a moment n+k+k1+k2+k3+k4, to obtain information about a third downlink beam pair set includes: performing, by the UE, blind detection on the third downlink channel at the moment n+k+k1+k2+k3+k4 based on N optimal target downlink beam pairs in the second target downlink beam pair set in the first measurement result, to obtain the information about the third downlink beam pair set.

With reference to the first aspect and the foregoing possible implementations, in another possible implementation, the first uplink channel is a periodic PUCCH, and periodic PUCCH is further used to transmit a HARQ, CSI information, beam information, and SR information.

With reference to the first aspect and the foregoing possible implementations, in another possible implementation, the second uplink channel is a preconfigured uplink channel specifically used for beam recovery, and an uplink beam configured for the second uplink channel is a beam pair specially used for uplink beam recovery, and is different from an uplink beam pair configured for the first uplink channel (a first beam pair is a beam pair configured for a periodic uplink control channel).

With reference to the first aspect and the foregoing possible implementations, in another possible implementation, the second uplink channel is a channel in a same timeslot as an RACH.

A second aspect of the embodiments of the present invention provides a link re-establishment method, including:

detecting, by a base station, a first uplink signal on a first uplink channel by using a first uplink beam pair set, where the first uplink signal is used to notify the base station that a first downlink beam pair set is invalid; and sending, by the base station, a first downlink signal to UE by using a second downlink beam pair set through a first downlink channel, where the first downlink signal is used to acknowledge that the base station receives the first uplink signal.

In the link re-establishment method provided in the embodiments of the present invention, the base station detects, on the first uplink channel by using the first uplink beam pair set, the first uplink signal used to notify the base station that the first downlink beam pair set is invalid; and sends, to the UE by using the second downlink beam pair set through the first downlink channel, the first downlink signal used to acknowledge that the base station receives the first uplink signal. The UE sends, to the base station, the first uplink signal used to notify the base station that the first downlink beam pair set is invalid, so that the base station can send the first downlink signal by using the second downlink beam pair set through the first downlink channel. In this way, a link can be recovered through negotiation between the base station and the UE, to resolve a problem that communication is interrupted in a process of communication between the base station and the UE because data cannot continue to be transmitted due to a block.

With reference to the second aspect, in a possible implementation, the first downlink signal is determined based on content included in the first uplink signal.

With reference to the second aspect and the foregoing possible implementation, in another possible implementation, the first uplink signal is a beam failure report or a beam recovery request.

With reference to the second aspect and the foregoing possible implementations, in another possible implementation, the first uplink signal is a beam failure report or a beam recovery request, the first uplink signal includes information about a first target downlink beam pair set, and the second downlink beam pair set is the first target downlink beam pair set.

With reference to the second aspect and the foregoing possible implementations, in another possible implementation, the first downlink signal is a downlink control channel NR-PDCCH or a first measurement pilot; and when the first downlink signal is the downlink control channel, the downlink control channel includes configuration information of the first measurement pilot.

With reference to the second aspect and the foregoing possible implementations, in another possible implementation, the downlink control channel further includes uplink resource information used to report a first measurement result, and the uplink resource information includes an uplink time-frequency resource and/or information about a second uplink beam pair set; and the method further includes: receiving, by the base station based on the uplink resource information, the first measurement result sent by the UE.

With reference to the second aspect and the foregoing possible implementations, in another possible implementation, after the receiving, by the base station based on the uplink resource information, the first measurement result sent by the UE, the method further includes: sending, by the base station, information about a third downlink beam pair set to the UE through a third downlink channel; and communicating, by the base station, with the UE based on the information about the third downlink beam pair set.

With reference to the second aspect and the foregoing possible implementations, in another possible implementation, before the sending, by the base station, a first downlink signal to UE by using a second downlink beam pair set through a first downlink channel, where the first downlink signal is used to acknowledge that the base station receives the first uplink signal, the method further includes: detecting, by the base station, the first uplink signal on a second uplink channel by using the second uplink beam pair set.

A third aspect of the embodiments of the present invention provides UE, including: a sending unit, configured to: when it is detected that a first downlink beam pair set is invalid, send a first uplink signal to a base station at a moment n by using a first uplink beam pair set through a first uplink channel, where the first uplink signal is used to notify the base station that the first downlink beam pair set is invalid; and a detection unit, configured to detect, at a moment n+k, a first downlink signal sent by the base station by using a second downlink beam pair set through a first downlink channel, to obtain a first detection result, where the first downlink signal is used to acknowledge that the base station receives the first uplink signal.

With reference to the third aspect, in a possible implementation, the first downlink signal is determined based on content included in the first uplink signal.

With reference to the third aspect and the foregoing possible implementation, in another possible implementation, the first uplink signal is a beam failure report or a beam recovery request, and the first downlink signal is a downlink control channel NR-PDCCH or a first measurement pilot; and the detection unit is specifically configured to perform blind detection on the downlink control channel at the moment n+k based on the second downlink beam pair set, to obtain the first measurement result, where the second downlink beam pair set is a preconfigured beam pair set used for beam recovery, and the second downlink beam pair set is different from the first downlink beam pair set.

With reference to the third aspect and the foregoing possible implementations, in another possible implementation, when the first downlink signal is the downlink control channel, the downlink control channel includes configuration information of the first measurement pilot; or when the first downlink signal is the first measurement pilot, configuration information of the first measurement pilot is preconfigured in the UE; and the detection unit is specifically configured to measure the first measurement pilot based on the configuration information of the first measurement pilot, to obtain the first detection result, where the first measurement pilot is a beam measurement pilot, and the first measurement result is information about a target downlink beam pair set.

With reference to the third aspect and the foregoing possible implementations, in another possible implementation, the first uplink signal is a beam failure report or a beam recovery request, and the first downlink signal is a downlink control channel NR-PDCCH; and the detection unit is specifically configured to obtain the first measurement result at the moment n+k based on detection on the downlink control channel, where the first measurement result is information about a target downlink beam pair set.

With reference to the third aspect and the foregoing possible implementations, in another possible implementation, the downlink control channel further includes uplink resource information used to report the first measurement result, and the uplink resource information includes an uplink time-frequency resource and/or information about a second uplink beam pair set; and the sending unit is further configured to send the first measurement result to the base station at a moment n+k+k1 based on the uplink resource information.

With reference to the third aspect and the foregoing possible implementations, in another possible implementation, the UE further includes a communications unit; the detection unit is further configured to detect a third downlink channel at a moment n+k+k1+k2, to obtain information about a third downlink beam pair set; and the communications unit is configured to communicate with the base station based on the information about the third downlink beam pair set.

With reference to the third aspect and the foregoing possible implementations, in another possible implementation, the detection unit is specifically configured to perform blind detection on the third downlink channel at the moment n+k+k1+k2 based on N optimal target downlink beam pairs in the target downlink beam pair set in the first measurement result, to obtain the information about the third downlink beam pair set.

With reference to the third aspect and the foregoing possible implementations, in another possible implementation, the first uplink signal is a beam failure report or a beam recovery request, the first uplink signal includes information about a first target downlink beam pair set, and the second downlink beam pair set is the first target downlink beam pair set; the first downlink signal is a downlink control channel NR-PDCCH or a first measurement pilot; and the detection unit is specifically configured to perform blind detection on the downlink control channel at the moment n+k based on the first target downlink beam pair set, to obtain the first measurement result, where the first target downlink beam pair set is different from the first downlink beam pair set.

With reference to the third aspect and the foregoing possible implementations, in another possible implementation, when the first downlink signal is the downlink control channel, the downlink control channel includes configuration information of the first measurement pilot; or when the first downlink signal is the first measurement pilot, configuration information of the first measurement pilot is preconfigured in the UE; and the detection unit is specifically configured to measure the first measurement pilot based on the configuration information of the first measurement pilot, to obtain the first detection result, where the first measurement pilot is a beam measurement pilot, and the first measurement result is information about a second target downlink beam pair set.

With reference to the third aspect and the foregoing possible implementations, in another possible implementation, the first uplink signal is a beam failure report or a beam recovery request, the first uplink signal includes information about a first target downlink beam pair set, and the second downlink beam pair set is the first target downlink beam pair set; the first downlink signal is a downlink control channel NR-PDCCH; and the detection unit is specifically configured to obtain the first measurement result at the moment n+k based on detection on the downlink control channel, where the first measurement result is information about a second target downlink beam pair set.

With reference to the third aspect and the foregoing possible implementations, in another possible implementation, the first downlink signal includes information about a third downlink beam pair set; and the communications unit is further configured to communicate with the base station based on the information about the third downlink beam pair set.

With reference to the third aspect and the foregoing possible implementations, in another possible implementation, the first uplink signal is a beam failure report or a beam recovery request; the UE further includes a determining unit; the determining unit is configured to determine that the first downlink signal is not detected at the moment n+k; and the sending unit is further configured to resend the first uplink signal to the base station at a moment n+k+k1 by using a second uplink beam pair set through a second uplink channel.

With reference to the third aspect and the foregoing possible implementations, in another possible implementation, the first uplink signal is a beam failure report or a beam recovery request; the UE further includes a determining unit; the determining unit is configured to determine that the first downlink signal is not detected at the moment n+k; and the sending unit is further configured to resend the first uplink signal to the base station at a moment n+k+k1 by using the first uplink beam pair set through the first uplink channel, where transmit power used to send the first uplink signal at the moment n+k+k1 is increased by X compared with transmit power at which the first uplink signal is sent at the moment n, and X is a preset power value.

With reference to the third aspect and the foregoing possible implementations, in another possible implementation, the detection unit is further configured to detect, at a moment n+k+k1+k2, the first downlink signal sent by the base station by using the second downlink beam pair set through the first downlink channel, to obtain the first detection result.

With reference to the third aspect and the foregoing possible implementations, in another possible implementation, the first downlink signal is a downlink control channel NR-PDCCH or a first measurement pilot; and the detection unit is specifically configured to perform blind detection on the downlink control channel at the moment n+k+k1+k2 based on the second downlink beam pair set, to obtain the first measurement result, where the second downlink beam pair set is a preconfigured beam pair set used for beam recovery, the second downlink beam pair set is different from the first downlink beam pair set, the first downlink signal includes information that is about a target uplink beam pair set and that is indicated to the UE, and the information about the target uplink beam pair set is obtained based on the second uplink beam pair set.

With reference to the third aspect and the foregoing possible implementations, in another possible implementation, when the first downlink signal is the downlink control channel, the downlink control channel includes configuration information of the first measurement pilot; or when the first downlink signal is the first measurement pilot, configuration information of the first measurement pilot is preconfigured in the UE; and the detection unit is specifically configured to measure the first measurement pilot based on the configuration information of the first measurement pilot, to obtain the first detection result, where the first measurement pilot is a beam measurement pilot, and the first measurement result is information about a target downlink beam pair set.

With reference to the third aspect and the foregoing possible implementations, in another possible implementation, the first downlink signal is a downlink control channel NR-PDCCH; and the detection unit is specifically configured to obtain the first measurement result at the moment n+k+k1+k2 based on detection on the downlink control channel, where the first measurement result is information about a target downlink beam pair set.

With reference to the third aspect and the foregoing possible implementations, in another possible implementation, the downlink control channel further includes uplink resource information used to report the first measurement result, and the uplink resource information includes an uplink time-frequency resource and/or information about a third uplink beam pair set; and the sending unit is further configured to send the first measurement result to the base station at a moment n+k+k1+k2+k3 based on the uplink resource information.

With reference to the third aspect and the foregoing possible implementations, in another possible implementation, the UE further includes a communications unit; the detection unit is further configured to detect a third downlink channel at a moment n+k+k1+k2+k3+k4, to obtain information about a third downlink beam pair set; and the communications unit is configured to communicate with the base station based on the information about the third downlink beam pair set.

With reference to the third aspect and the foregoing possible implementations, in another possible implementation, the detection unit is specifically configured to perform blind detection on the third downlink channel at the moment n+k+k1+k2+k3+k4 based on N optimal target downlink beam pairs in the target downlink beam pair set in the first measurement result, to obtain the information about the third downlink beam pair set.

With reference to the third aspect and the foregoing possible implementations, in another possible implementation, the first uplink signal is a beam failure report or a beam recovery request, the first uplink signal includes information about a first target downlink beam pair set, and the second downlink beam pair set is the first target downlink beam pair set; the UE further includes a determining unit; the determining unit is configured to determine that the first downlink signal is not detected at the moment n+k; and the sending unit is further configured to resend the first uplink signal to the base station at a moment n+k+k1 by using a second uplink beam pair set through a second uplink channel.

With reference to the third aspect and the foregoing possible implementations, in another possible implementation, the first uplink signal is a beam failure report or a beam recovery request; the UE further includes a determining unit, configured to determine that the first downlink signal is not detected at the moment n+k; and the sending unit is configured to resend the first uplink signal to the base station at a moment n+k+k1 by using the first uplink beam pair set through the first uplink channel, where transmit power used to send the first uplink signal at the moment n+k+k1 is increased by X compared with transmit power at which the first uplink signal is sent at the moment n, and X is a preset power value.

With reference to the third aspect and the foregoing possible implementations, in another possible implementation, the detection unit is further configured to detect, at a moment n+k+k1+k2, the first downlink signal sent by the base station by using the first target downlink beam pair set through the first downlink channel, to obtain the first detection result.

With reference to the third aspect and the foregoing possible implementations, in another possible implementation, the first downlink signal is a downlink control channel NR-PDCCH or a first measurement pilot; and the detection unit is specifically configured to perform blind detection on the downlink control channel at the moment n+k+k1+k2 based on the first target downlink beam pair set, to obtain the first measurement result, where the first target downlink beam pair set is different from the first downlink beam pair set.

With reference to the third aspect and the foregoing possible implementations, in another possible implementation, when the first downlink signal is the downlink control channel, the downlink control channel includes configuration information of the first measurement pilot; or when the first downlink signal is the first measurement pilot, configuration information of the first measurement pilot is preconfigured in the UE; and the detection unit is specifically configured to measure the first measurement pilot based on the configuration information of the first measurement pilot, to obtain the first detection result, where the first measurement pilot is a beam measurement pilot, and the first measurement result is information about a second target downlink beam pair set.

With reference to the third aspect and the foregoing possible implementations, in another possible implementation, the first downlink signal is a downlink control channel NR-PDCCH; and the detection unit is specifically configured to obtain the first measurement result at the moment n+k+k1+k2 based on detection on the downlink control channel, where the first measurement result is information about a second target downlink beam pair set.

With reference to the third aspect and the foregoing possible implementations, in another possible implementation, the first downlink signal includes information about a target uplink beam pair set; and the sending unit is further configured to send the first measurement result to the base station at a moment n+k+k1+k2+k3 by using the target uplink beam pair set.

With reference to the third aspect and the foregoing possible implementations, in another possible implementation, the detection unit is further configured to detect a third downlink channel at a moment n+k+k1+k2+k3+k4, to obtain information about a third downlink beam pair set; and the communications unit is configured to communicate with the base station based on the information about the third downlink beam pair set.

With reference to the third aspect and the foregoing possible implementations, in another possible implementation, the detection unit is specifically configured to perform blind detection on the third downlink channel at the moment n+k+k1+k2+k3+k4 based on N optimal target downlink beam pairs in the second target downlink beam pair set in the first measurement result, to obtain the information about the third downlink beam pair set.

A fourth aspect of the embodiments of the present invention provides a base station, including: a detection unit, configured to detect a first uplink signal on a first uplink channel by using a first uplink beam pair set, where the first uplink signal is used to notify the base station that a first downlink beam pair set is invalid; and a sending unit, configured to send a first downlink signal to UE by using a second downlink beam pair set through a first downlink channel, where the first downlink signal is used to acknowledge that the base station receives the first uplink signal.

With reference to the fourth aspect, in a possible implementation, the first downlink signal is determined based on content included in the first uplink signal.

With reference to the fourth aspect and the foregoing possible implementation, in another possible implementation, the first uplink signal is a beam failure report or a beam recovery request.

With reference to the fourth aspect and the foregoing possible implementations, in another possible implementation, the first uplink signal is a beam failure report or a beam recovery request, the first uplink signal includes information about a first target downlink beam pair set, and the second downlink beam pair set is the first target downlink beam pair set.

With reference to the fourth aspect and the foregoing possible implementations, in another possible implementation, the first downlink signal is a downlink control channel NR-PDCCH or a first measurement pilot; and when the first downlink signal is the downlink control channel, the downlink control channel includes configuration information of the first measurement pilot.

With reference to the fourth aspect and the foregoing possible implementations, in another possible implementation, the downlink control channel further includes uplink resource information used to report a first measurement result, and the uplink resource information includes an uplink time-frequency resource and/or information about a second uplink beam pair set; the base station further includes a receiving unit; and the receiving unit is configured to receive, based on the uplink resource information, the first measurement result sent by the UE.

With reference to the fourth aspect and the foregoing possible implementations, in another possible implementation, the base station further includes a communications unit; the sending unit is further configured to send information about a third downlink beam pair set to the UE through a third downlink channel; and the communications unit is configured to communicate with the UE based on the information about the third downlink beam pair set.

With reference to the fourth aspect and the foregoing possible implementations, in another possible implementation, the detection unit is further configured to detect the first uplink signal on a second uplink channel by using the second uplink beam pair set.

A fifth aspect of the embodiments of the present invention provides UE, and the UE may include at least one processor, a memory, a transceiver, and a communications bus. The at least one processor, the memory, and the transceiver are connected by using the communications bus. The memory is configured to store a computer execution instruction, and when the UE runs, the processor executes the computer execution instruction stored in the memory, so that the UE performs the link re-establishment method according to any one of the first aspect or the possible implementations of the first aspect.

A sixth aspect of the embodiments of the present invention provides a base station, and the base station may include at least one processor, a memory, a transceiver, and a communications bus. The at least one processor, the memory, and the transceiver are connected by using the communications bus. The memory is configured to store a computer execution instruction, and when the base station runs, the processor executes the computer execution instruction stored in the memory, so that the base station performs the link re-establishment method according to any one of the second aspect or the possible implementations of the second aspect.

A seventh aspect of the embodiments of the present invention provides a computer storage medium, configured to store a computer software instruction used by the foregoing UE. The computer software instruction includes a program designed for performing the foregoing link re-establishment method.

An eighth aspect of the embodiments of the present invention provides a computer storage medium, configured to store a computer software instruction used by the foregoing base station. The computer software instruction includes a program designed for performing the foregoing link re-establishment method.

DESCRIPTION OF EMBODIMENTS

Embodiments of the present invention provide a link re-establishment method, and a basic principle of the method is as follows: When detecting that a first downlink beam pair set is invalid, UE sends, to a base station at a moment n by using a first uplink beam pair set through a first uplink channel, a first uplink signal used to notify the base station that the first downlink beam pair set is invalid; and detects, at a moment n+k, a first downlink signal sent by the base station by using a second downlink beam pair set through a first downlink channel, to obtain a first detection result, where the first downlink signal is used to acknowledge that the base station receives the first uplink signal. The UE sends, to the base station, the first uplink signal used to notify the base station that the first downlink beam pair set is invalid, so that the base station can send the first downlink signal by using the second downlink beam pair set through the first downlink channel. In this way, a link can be recovered through negotiation between the base station and the UE, to resolve a problem that communication is interrupted in a process of communication between the base station and the UE because data cannot continue to be transmitted due to a block.

The following describes implementations of the embodiments of the present invention in detail with reference to the accompanying drawings.

Figure 1:
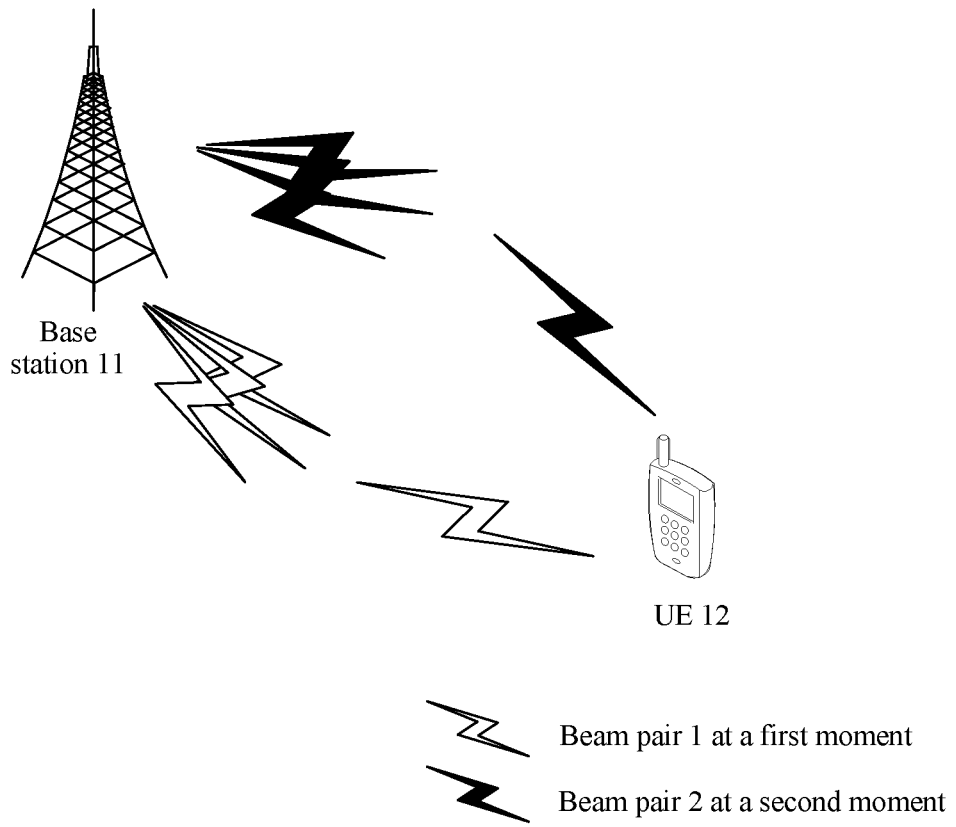
FIG. 1 is a simplified schematic diagram of an architecture of a communications system to which an embodiment of the present invention may be applied according to an embodiment of the present invention.

FIG. 1 is a simplified schematic diagram of an architecture of a communications system to which an embodiment of the present invention may be applied. The communications system to which this embodiment of the present invention may be applied may be a fifth generation mobile communications technology (the fifth Generation Telecommunication, 5G) system and a subsequent evolved communications system; or may be a communications system such as an LTE system, a third generation mobile communications technology (the third Generation Telecommunication, 3G) system, a second generation mobile communications technology (the second Generation Telecommunication, 2G) system, a Wireless Fidelity (Wireless Fidelity, WiFi) system, and a Worldwide Interoperability for Microwave Access (World Interoperability for Microwave Access, WIMAX) system. In this embodiment of the present invention, a beamforming technology may be used in each of the foregoing communications systems, so that a plurality of antenna modules integrated into a transceiver are used to form an array, to implement a directional beam. Therefore, devices in the communications system can communicate with each other by using the directional beam.

As shown in FIG. 1, the architecture of the communications system may include a base station 11 and UE 12.

The base station 11 may be a wireless communication base station (Base Station, BS), a base station controller, or the like. The base station 11 may specifically include a user-plane base station and a control-plane base station. The base station 11 is an apparatus that is deployed in a radio access network and that is configured to provide a wireless communication function for the UE 12. Main functions of the base station 11 include radio resource management, Internet Protocol (Internet Protocol, IP) header compression and user data stream encryption, mobility management entity (Mobile Management Entity, MME) selection during attachment of the user equipment, routing of user plane data to a serving gateway (Service Gateway, SGW), paging message organization and sending, broadcast message organization and sending, measurement and measurement report configuration that are for the purpose of mobility or scheduling, and the like. The base station 11 may include a macro base station, a micro base station, a relay station, an access point, and the like in various forms. In communications systems in which different radio access technologies are used, a device that has a base station function may have different names. For example, in an LTE system, the device is referred to as an evolved NodeB (Evolved NodeB, eNB or eNodeB); in a 3G system, the device is referred to as a NodeB (Node B); in a 5G system, the device is referred to as a TRP; and in a next-generation communications system, the device is referred to as a gNB. With evolution of communications technologies, the name "base station" may change. In addition, in another possible case, the base station 11 may be another apparatus providing a wireless communication function for the UE 12. For ease of description, in this embodiment of the present invention, an apparatus providing a wireless communication function for the UE 12 is referred to as the base station 11.

The UE 12 may be a wireless terminal or a wired terminal. The wireless terminal may be a device that provides voice and/or data connectivity for a user, a handheld device (such as a mobile phone, an intelligent terminal, a multimedia device, or a streaming media device) having a wireless connection function, an in-vehicle device, a wearable device, a computing device, or another processing device connected to a wireless modem. The wireless terminal may communicate with one or more core networks by using a radio access network (for example, Radio Access Network, RAN). The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus, which exchanges voice and/or data with the radio access network.

For example, the wireless terminal may be a device such as a personal communications service (Personal Communication Service, PCS) phone, a cordless telephone set, a Session Initiation Protocol (SIP) phone, a wireless local loop (WLL, Wireless Local Loop) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), or a user agent (User Agent). In an embodiment, as shown in FIG. 1, the UE 12 included in the network architecture in the present invention is a mobile phone.

In this embodiment of the present invention, the base station 11 and the UE 12 communicate with each other by using one or more groups of beam pairs. As shown in FIG. 1, the base station 11 and the UE 12 may transmit data to each other at a first moment by using a beam pair 1, and transmit data to each other at a second moment by using a beam pair 2.

Figure 2:
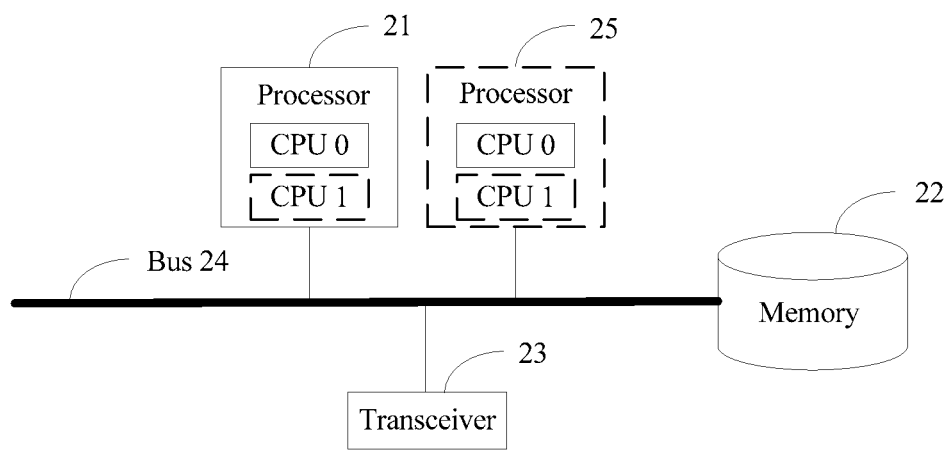
FIG. 2 is a schematic composition diagram of a base station according to an embodiment of the present invention.

FIG. 2 is a schematic composition diagram of a base station according to an embodiment of the present invention. As shown in FIG. 2, the base station may include at least one processor 21, a memory 22, a transceiver 23, and a bus 24.

The following describes each component of the base station in detail with reference to FIG. 2.

The processor 21 is a control center of the base station, and may be a processor, or may be a general name of a plurality of processing elements. For example, the processor 21 is a central processing unit (Central Processing Unit, CPU), or may be an application-specific integrated circuit (Application Specific Integrated Circuit, ASIC), or one or more integrated circuits configured to implement this embodiment of the present invention, for example, one or more microprocessors (Digital Signal Processor, DSP) or one or more field programmable gate arrays (Field Programmable Gate Array, FPGA).

The processor 21 may perform various functions of the base station by running or executing a software program stored in the memory 22 and invoking data stored in the memory 22.

During specific implementation, in an embodiment, the processor 21 may include one or more CPUs, for example, a CPU 0 and a CPU 1 shown in FIG. 2.

During specific implementation, in an embodiment, the base station may include a plurality of processors, for example, the processor 21 and a processor 25 shown in FIG. 2. Each of the processors may be a single-core processor (single-CPU) or may be a multi-core processor (multi-CPU). The processor herein may be one or more devices, circuits, and/or processing cores configured to process data (for example, a computer program instruction).

The memory 22 may be a read-only memory (Read-Only Memory, ROM) or another type of static storage device capable of storing static information and instructions, or a random access memory (Random Access Memory, RAM) or another type of dynamic storage device capable of storing information and instructions; or may be an electrically erasable programmable read-only memory (Electrically Erasable Programmable Read-Only Memory, EEPROM), a compact disc read-only memory (Compact Disc Read-Only Memory, CD-ROM), or other compact disc storage or optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer, but is not limited thereto. The memory 22 may exist independently and is connected to the processor 21 by using the bus 24. Alternatively, the memory 22 may be integrated with the processor 21.

The memory 22 is configured to store a software program that performs the solution of the present invention, and the processor 21 controls execution of the software program.

The transceiver 23 is configured to communicate with another device or a communications network, such as an Ethernet, a radio access network (Radio Access Network, RAN), or a wireless local area network (Wireless Local Area Networks, WLAN). The transceiver 23 may include all or a part of a baseband processor, and may further optionally include an RF processor. The RF processor is configured to transmit and receive an RF signal. The baseband processor is configured to process a baseband signal converted from an RF signal or a baseband signal to be converted into an RF signal.

The bus 24 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of indication, the bus is indicated by using only one bold line in FIG. 2. However, it does not indicate that there is only one bus or only one type of bus.

A device structure shown in FIG. 2 constitutes no limitation to the base station. More or fewer components than those shown in the figure may be included, or some components are combined, or component arrangements are different.

Figure 3:
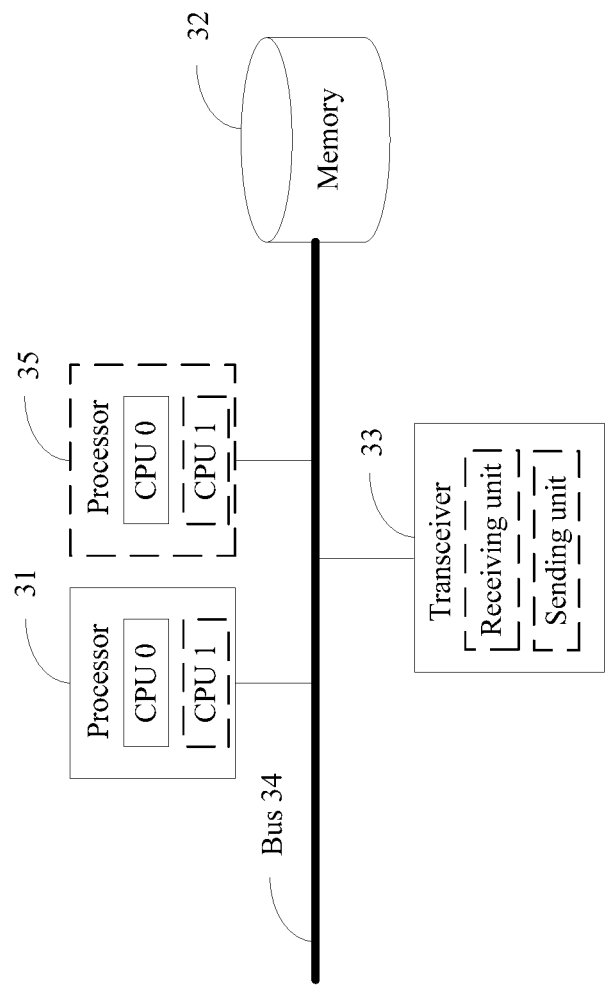
FIG. 3 is a schematic composition diagram of UE according to an embodiment of the present invention.

FIG. 3 is a schematic composition diagram of UE according to an embodiment of the present invention. As shown in FIG. 3, the UE may include at least one processor 31, a memory 32, a transceiver 33, and a bus 34.

The following describes each component of the UE in detail with reference to FIG. 3.

The processor 31 may be a processor, or may be a general name of a plurality of processing elements. For example, the processor 31 may be a general purpose CPU, or may be an ASIC or one or more integrated circuits configured for controlling execution of a solution program of the present invention, for example, one or more DSPs or one or more FPGAs. The processor 31 may perform various functions of the UE by running or executing a software program stored in the memory 32 and invoking data stored in the memory 32.

During specific implementation, in an embodiment, the processor 31 may include one or more CPUs, For example, as shown in FIG. 3, the processor 31 includes a CPU 0 and a CPU 1.

During specific implementation, in an embodiment, the UE may include a plurality of processors. For example, as shown in FIG. 3, the UE includes the processor 31 and a processor 35. Each of the processors may be a single-CPU, or may be a multi-CPU. The processor herein may be one or more devices, circuits, and/or processing cores configured to process data (for example, a computer program instruction).

The memory 32 may be a ROM or another type of static storage device capable of storing static information and instructions, or a RAM or another type of dynamic storage device capable of storing information and instructions; or may be an EEPROM, a CD-ROM, or other compact disc storage or optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer, but is not limited thereto. The memory 32 may exist independently and is connected to the processor 31 by using the bus 34. Alternatively, the memory 32 may be integrated with the processor 31.

The transceiver 33 is configured to communicate with another device or a communications network, such as an Ethernet, a RAN, or a WLAN. The transceiver 33 may include a receiving unit for implementing a receiving function and a sending unit for implementing a sending function.

The bus 34 may be an ISA bus, a PCI bus, an EISA bus, or the like. The bus may be classified into an address bus, a data bus, a control bus, and the like. For ease of indication, the bus is indicated by using only one bold line in FIG. 3. However, it does not indicate that there is only one bus or only one type of bus.

A device structure shown in FIG. 3 constitutes no limitation to the UE. More or fewer components than those shown in the figure may be included, or some components are combined, or component arrangements are different. Although not shown, the UE may further include a battery, a camera, a Bluetooth module, a GPS module, a display, and the like. Details are not described herein.

FIG. 4A, FIG. 4B, FIG. 4C, and FIG. 4D are flowcharts of a link re-establishment method according to an embodiment of the present invention. As shown in FIG. 4A, FIG. 4B, FIG. 4C, and FIG. 4D, the method may include the following steps.

401. A base station sends a second downlink signal to UE on a second downlink channel by using a first downlink beam pair set.

In a communications system in which a beamforming technology is used, in order that the UE can normally access the base station and can maintain stable communication with the base station, the UE and the base station each need to perform a beam training process, to determine N better downlink beam pairs used for downlink data transmission and M better uplink beam pairs used for uplink data transmission, so that the base station and the UE transmit data to each other by using the determined better pairs in a subsequent communication process. N and M each are an integer greater than or equal to 1. It is assumed that the downlink beam pair is <Bx, Bx'>. Bx represents a transmit beam of the base station, and Bx' represents a receive beam of the UE. It is assumed that the uplink beam pair is <By, By'>, where By represents a transmit beam of the UE, and By' represents a receive beam of the base station.

For example, when the base station needs to send the second downlink signal to the UE, the base station may send the second downlink signal to the UE by using the first downlink beam pair set through the second downlink channel. The second downlink signal may be a signal that is preconfigured by the base station and that is associated with a control channel or a data channel. For example, the second downlink signal is a channel state information-reference signal (Channel State Information-Reference Signals, CSI-RS), or the second downlink signal is a synchronization signal. The first downlink beam pair set includes at least one downlink beam pair.

For example, it is assumed that two downlink beam pairs are determined in the beam training process, and are respectively <B1, B1'> and <B2, B2'>. As shown in FIG. 5 to FIG. 8, when the base station needs to send a CSI-RS to the UE, the base station may send the CSI-RS to the UE through the second downlink channel by using the downlink beam pair <B1, B1'> and the downlink beam pair <B2, B2'>.

402. The UE detects the second downlink signal on the second downlink channel by using the first downlink beam pair set.

For example, as shown in FIG. 5 to FIG. 8, the UE may detect the CSI-RS on the second downlink channel by using the downlink beam pair <B1, B1'> and the downlink beam pair <B2, B2'>.

403. When detecting that the first downlink beam pair set is invalid, the UE sends a first uplink signal to the base station at a moment n by using a first uplink beam pair set through a first uplink channel.

For example, in a process in which the UE detects the second downlink signal on the second downlink channel by using the first downlink beam pair set, when determining that the detected second downlink signal meets a preset condition, the UE may determine that the first downlink beam pair set is invalid, that is, determine that a downlink is faulty.

When determining that reference signal received power (Reference Signal Received Power, RSRP) of the detected second downlink signal is less than a preset threshold, the UE may determine that the detected second downlink signal meets the preset condition. The preset threshold may be set according to a requirement in an actual application scenario, and is not specifically limited herein in this embodiment of the present invention. For example, as shown in FIG. 5 to FIG. 8, the UE may detect the second downlink signal on the second downlink channel by using the downlink beam pair <B1, B1'> and the downlink beam pair <B2, B2'>, and when determining that the RSRP of the detected second downlink signal is less than the preset threshold, determine that the downlink beam pair <B1, B1'> and the downlink beam pair <B2, B2'> are invalid.

That the UE detects that the first downlink beam pair set is invalid may be specifically as follows: Quality of N first downlink beam pairs in M first downlink beam pairs in the first downlink beam pair set is less than a specific threshold. The M first downlink beam pairs included in the first downlink beam pair set correspond to M first downlink reference signals. As shown in FIG. 4E, quality of a first downlink beam pair is determined by detecting received quality of a first downlink reference signal corresponding to the first downlink beam pair. The first downlink reference signal may be CSI-RSs on a downlink control channel (NR-PDCCH) that have a same QCL assumption, SS blocks having a same QCL assumption, DMRSs on a common control channel (common control channel) that have a same QCL assumption, or DMRSs on a group common control channel that have a same QCL assumption.

When detecting that the first downlink beam pair set is invalid, the UE may send, to the base station at the moment n by using the first uplink beam pair set through the first uplink channel, the first uplink signal used to notify the base station that the first downlink beam pair set is invalid. The first uplink beam pair set includes at least one first uplink beam pair. For example, it is assumed that one uplink beam pair <B3, B3'> is determined in the beam training process. As shown in FIG. 5 to FIG. 8, the UE may send the first uplink signal to the base station at the moment n by using the uplink beam pair <B3, B3'> through the first uplink channel.

In this embodiment of the present invention, the first uplink signal may be in the following two types:

First type: The first uplink signal is a beam failure report (beam failure report) or a beam recovery request (beam recovery request). The UE may send the first uplink signal in the first type to the base station when the UE has no capability of re-determining a downlink beam pair set, or when the UE has a capability of re-determining a downlink beam pair set but does not determine a downlink beam pair set used for downlink data transmission.

Second type: The first uplink signal is a beam failure report or a beam recovery request, and the first uplink signal includes information about a target downlink beam pair set. When the UE has a capability of re-determining a downlink beam pair set and determines a downlink beam pair set that can be used for downlink data transmission, the UE may recommend the determined downlink beam pair set to the base station as the target downlink beam pair set, and may send the first uplink signal in the second type to the base station. The target downlink beam pair set is used by the base station to send downlink data to the UE, and the information about the target downlink beam pair set may include a beam identifier and beam quality of the target downlink beam pair set.

For example, the beam quality of the target downlink beam pair set may be RSRP of each target downlink beam pair in the target downlink beam pair set, or may be a channel quality indicator (Channel Quality Indicator, CQI) used when it is assumed that data is transmitted in a specific transmission mode. The transmission mode may be a space frequency block code (Space Frequency Block Code, SFBC) or precoder cycling (precoder cycling).

404. The base station detects the first uplink signal on the first uplink channel by using the first uplink beam pair set.

For example, as shown in FIG. 5 to FIG. 8, the base station may detect the first uplink signal on the first uplink channel by using the uplink beam pair <B3, B3'>, and perform the following steps based on different detection results. Details are as follows.

Figure 4A:
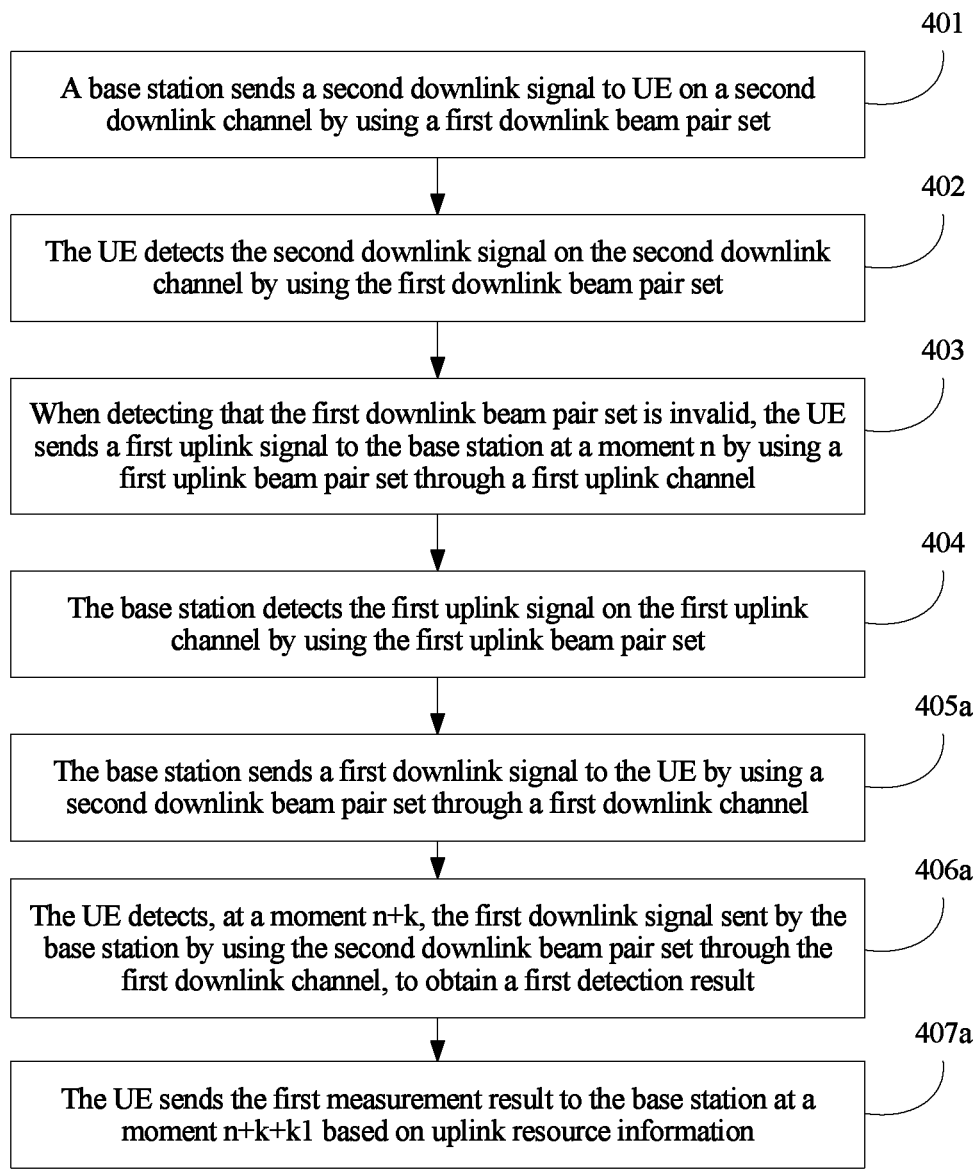
FIG. 4A is a flowchart of a link re-establishment method according to an embodiment of the present invention.
Figure 5:
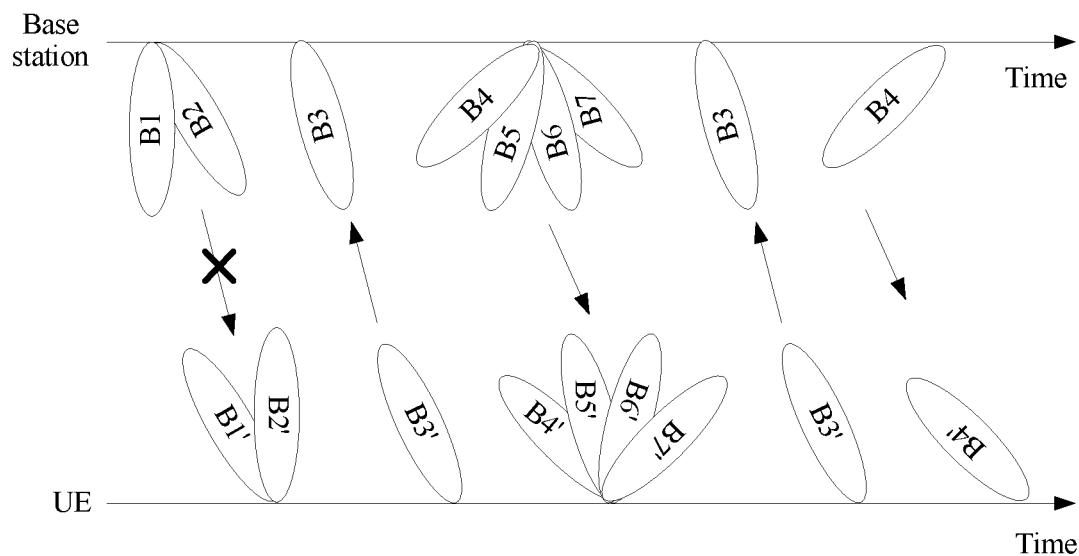
FIG. 5 is a schematic diagram of an application scenario of a link re-establishment method according to an embodiment of the present invention.

As shown in FIG. 5, when the base station detects the first uplink signal on the first uplink channel by using the first uplink beam pair set and the detected first uplink signal is in the first type, the base station may perform the following step 405a to step 407a, as shown in FIG. 4A.

Figure 4B:
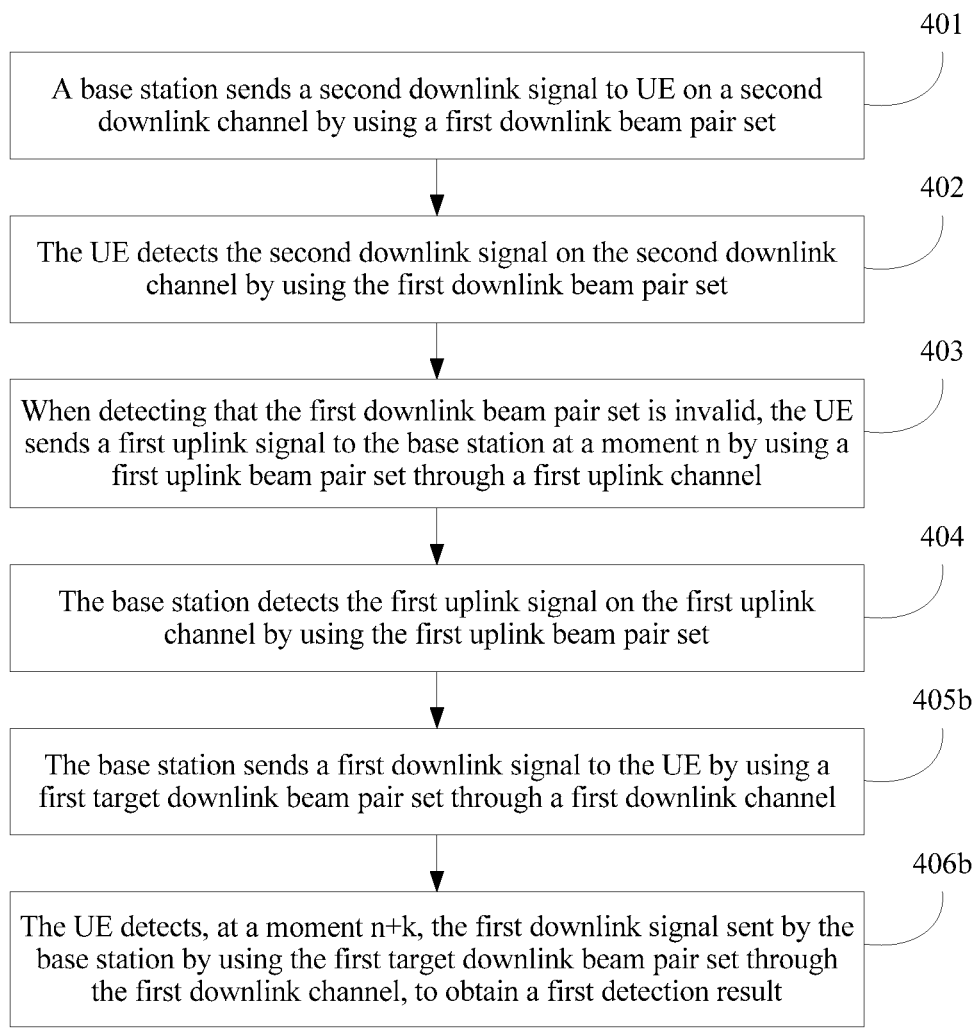
FIG. 4B is a flowchart of another link re-establishment method according to an embodiment of the present invention.
Figure 6:
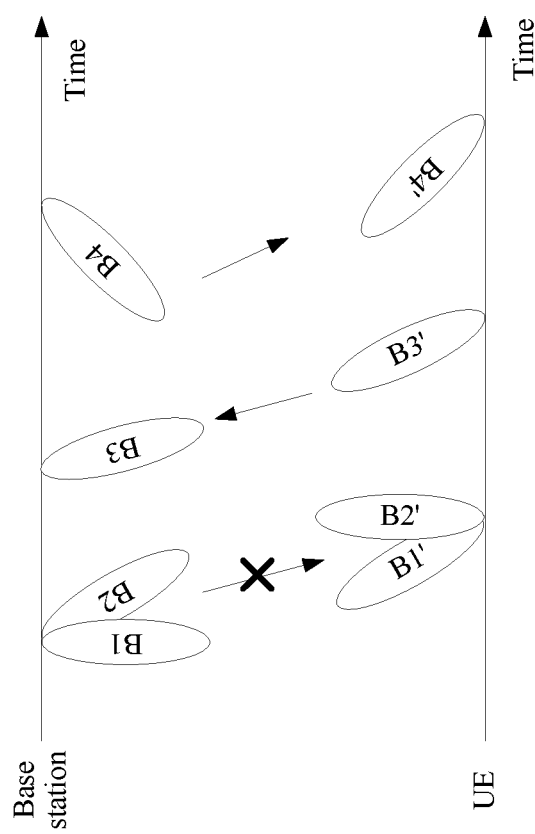
FIG. 6 is a schematic diagram of an application scenario of another link re-establishment method according to an embodiment of the present invention.

As shown in FIG. 6, when the base station detects the first uplink signal on the first uplink channel by using the first uplink beam pair set and the detected first uplink signal is in the second type, the base station may perform the following step 405b and step 406b, as shown in FIG. 4B.

Figure 4C:
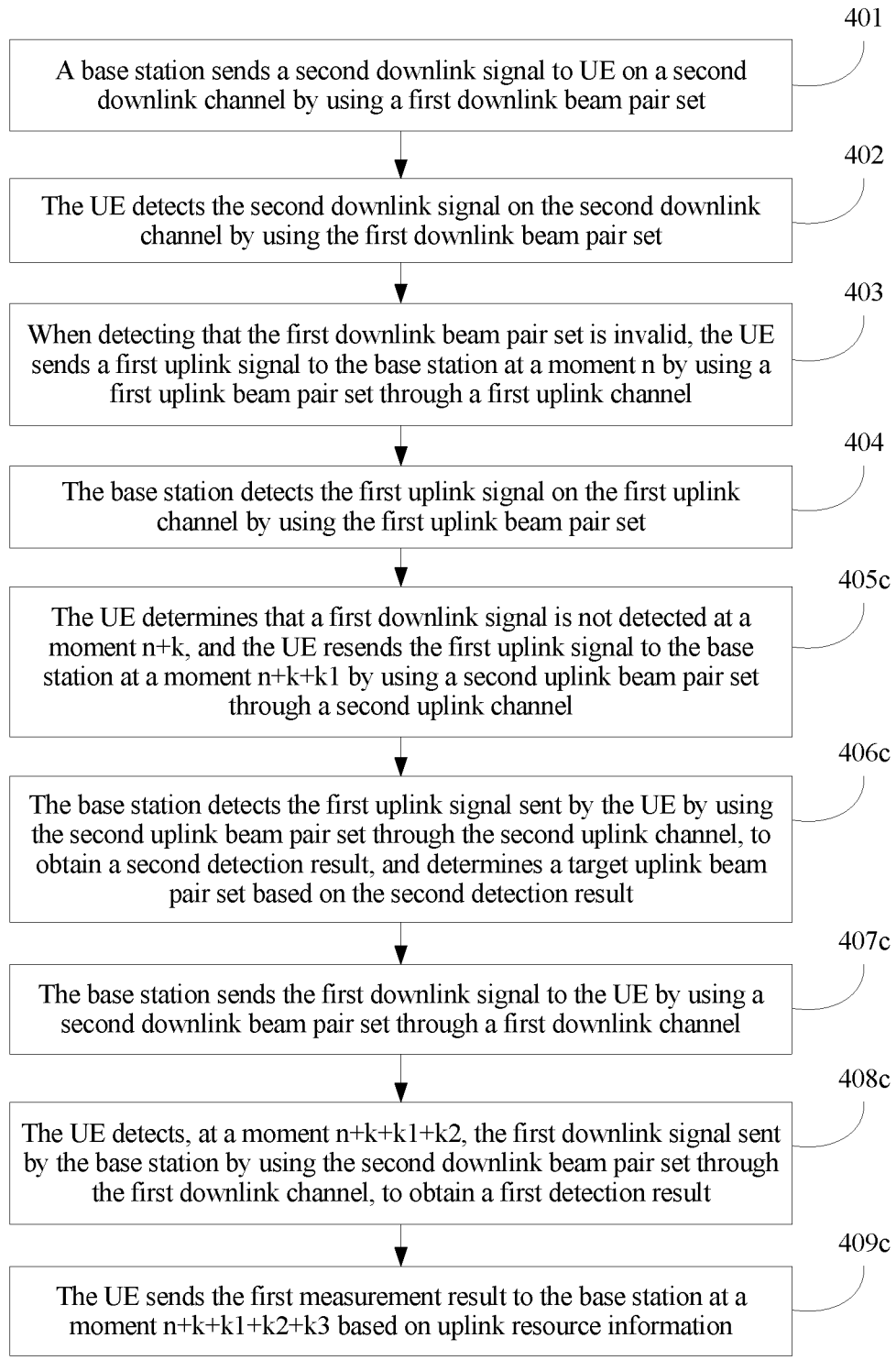
FIG. 4C is a flowchart of another link re-establishment method according to an embodiment of the present invention.
Figure 7:
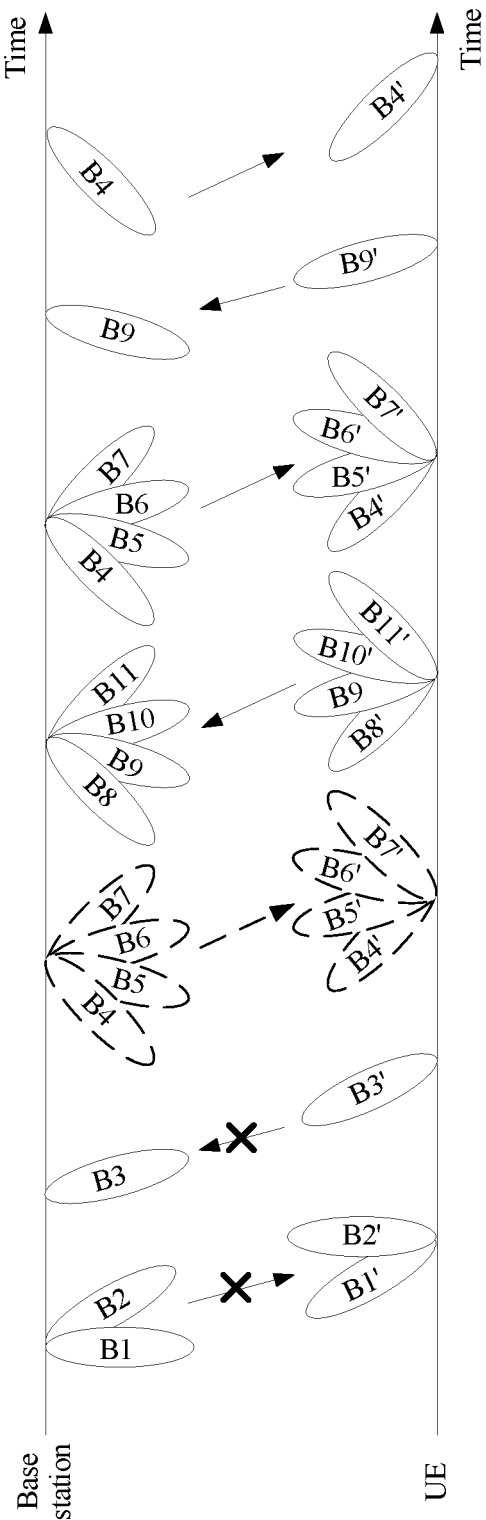
FIG. 7 is a schematic diagram of an application scenario of another link re-establishment method according to an embodiment of the present invention.

As shown in FIG. 7, when the base station does not detect the first uplink signal on the first uplink channel by using the first uplink beam pair set and the first uplink signal sent by the UE in step 403 is in the first type, the base station may perform the following step 405c to step 409c, as shown in FIG. 4C.

Figure 4D:
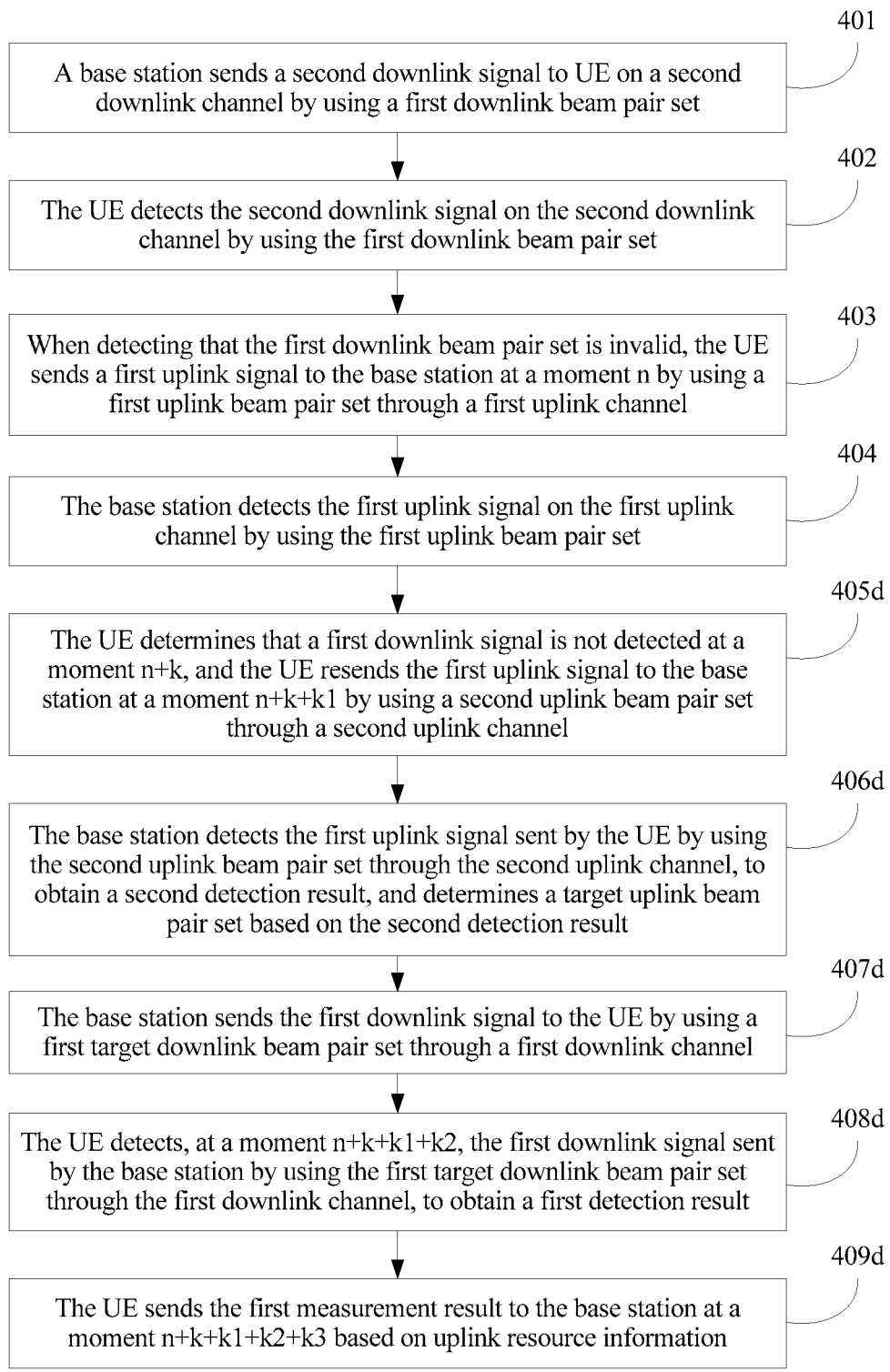
FIG. 4D is a flowchart of another link re-establishment method according to an embodiment of the present invention.
Figure 4E:
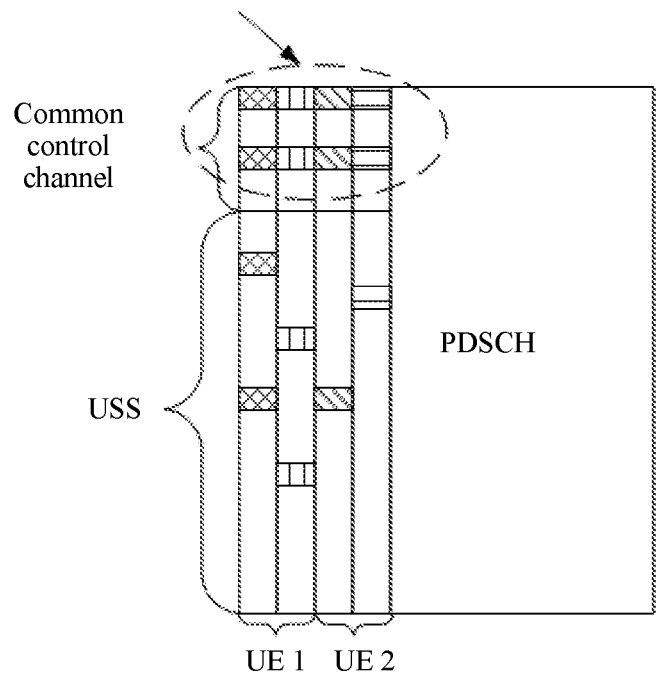
FIG. 4E is a schematic diagram of signal resource allocation according to an embodiment of the present invention.
Figure 8:
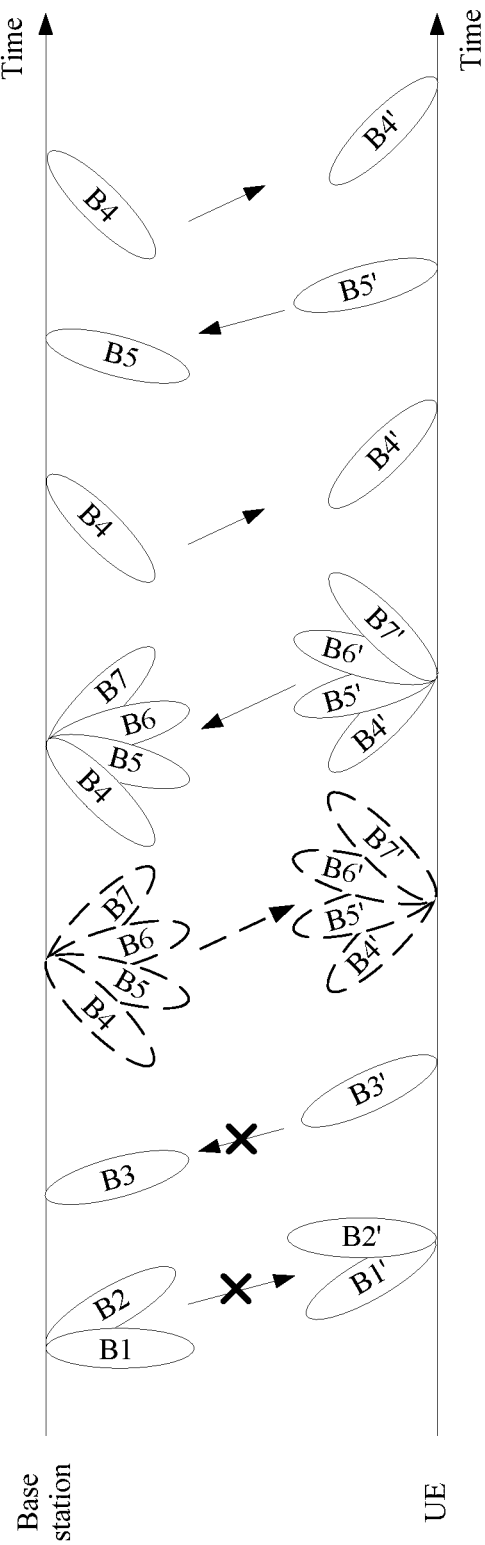
FIG. 8 is a schematic diagram of an application scenario of another link re-establishment method according to an embodiment of the present invention.

As shown in FIG. 8, when the base station does not detect the first uplink signal on the first uplink channel by using the first uplink beam pair set and the first uplink signal sent by the UE in step 403 is in the second type, the base station may perform the following step 405d to step 409d, as shown in FIG. 4D.

405a. The base station sends a first downlink signal to a UE by using a second downlink beam pair set through a first downlink channel.

When the base station detects the first uplink signal and the detected first uplink signal is in the first type, the base station may learn that the first downlink beam pair set is invalid. In this case, the base station may send the first downlink signal to the UE by using the second downlink beam pair set through the first downlink channel. The first downlink signal is used to acknowledge that the base station receives the first uplink signal. To be specific, the first downlink signal is a response signal of the first uplink signal. For example, the first downlink signal may be a physical downlink control channel (Physical Downlink Control Channel, PDCCH), or the first downlink signal may be a first measurement pilot. For example, as shown in FIG. 5, the base station repeatedly sends the PDCCH to the UE through the first downlink channel by using a downlink beam pair <B4, B4'>, a downlink beam pair <B5, B5'>, a downlink beam pair <B6, B6'>, and a downlink beam pair <B7, B7'>.

For example, beam information of each second downlink beam pair in the second downlink beam pair set is preconfigured in the base station. In this way, for each second downlink beam pair, the base station may send the first downlink signal to the UE based on the preconfigured beam information of the second downlink beam pair by using the second downlink beam pair through the first downlink channel. The beam information may be quality control level (Quality Control Level, QCL) information, and the beam information may include beam pair information.

For example, the beam information includes a beam pattern (pattern) corresponding to each orthogonal frequency division multiplexing (Orthogonal Frequency Division Multiplexing, OFDM) symbol, or includes an association between OFDM symbols and different CSI-RSs or QCLs of different CSI-SSs. For example, a first OFDM symbol is associated with a CSI-RS configuration (configuration) 1 corresponding to a beam 1, and a second OFDM symbol is associated with a CSI-RS configuration 2 corresponding to a beam 2.

406a. The UE detects, at a moment n+k, the first downlink signal sent by the base station by using the second downlink beam pair set through the first downlink channel, to obtain a first detection result.

The UE may detect, at the moment n+k, the first downlink signal sent by the base station by using the second downlink beam pair set through the first downlink channel, to obtain the first detection result. In addition, further, the UE may select a better downlink beam pair set from the second downlink beam pair set and/or another downlink beam pair set based on the first detection result, and use the selected downlink beam pair set as a target downlink beam pair set. The determined target downlink beam pair set may include at least one target downlink beam pair.

For example, as shown in FIG. 5, the UE separately detects, at the moment n+k, first downlink signals sent by the base station through the first downlink channel by using the downlink beam pair <B4, B4'>, the downlink beam pair <B5, B5'>, the downlink beam pair <B6, B6'>, and the downlink beam pair <B7, B7'>, to obtain the first detection result; and selects a better downlink beam pair from the downlink beam pair <B4, B4'>, the downlink beam pair <B5, B5'>, the downlink beam pair <B6, B6'>, and the downlink beam pair <B7, B7'> based on the first detection result, and uses the selected downlink beam pair set as the target downlink beam pair set. It is assumed that the target downlink beam pair determined by the UE is <B4, B4'>. Certainly, the target downlink beam pair set determined by the UE may not belong to the second downlink beam pair set.

For example, step 406a may be implemented in three manners.

In a first possible implementation, the first downlink signal is the downlink control channel (NR-PDCCH), and the downlink control channel includes configuration information of the first measurement pilot. The UE may perform blind detection on the downlink control channel at the moment n+k based on the second downlink beam pair set, to obtain the first measurement result. The second downlink beam pair set is a preconfigured beam pair set used for beam recovery, and the second downlink beam pair set is different from the first downlink beam pair set. That the UE performs blind detection on the downlink control channel at the moment n+k based on the second downlink beam pair set, to obtain the first measurement result may be specifically as follows: The UE measures the first measurement pilot at the moment n+k based on the configuration information of the first measurement pilot, to obtain the first detection result. The first measurement pilot is a beam measurement pilot, and the first measurement result is information about the target downlink beam pair set.

In a second possible implementation, the first downlink signal is the first measurement pilot, and configuration information of the first measurement pilot is preconfigured in the UE. The UE may perform blind detection on the downlink control channel at the moment n+k based on the second downlink beam pair set, to obtain the first measurement result. The second downlink beam pair set is a preconfigured beam pair set used for beam recovery, and the second downlink beam pair set is different from the first downlink beam pair set. That the UE performs blind detection on the downlink control channel at the moment n+k based on the second downlink beam pair set, to obtain the first measurement result may be specifically as follows: The UE measures the first measurement pilot based on the configuration information of the first measurement pilot, to obtain the first detection result. The first measurement pilot is a beam measurement pilot, and the first measurement result is information about the target downlink beam pair set.

In a third possible implementation, the first downlink signal is the downlink control channel (NR-PDCCH). The UE may obtain the first measurement result at the moment n+k based on detection on the downlink control channel. The first measurement result is information about the target downlink beam pair set.

In addition, further, the downlink control channel may include uplink resource information used to report the first measurement result. The uplink resource information includes an uplink time-frequency resource and/or information about a second uplink beam pair set. The second uplink beam pair set may be a beam pair set different from the first uplink beam pair set, may be a beam pair set the same as the first uplink beam pair set, or may be a set including some uplink beam pairs in the first uplink beam pair set.

407a. The UE sends the first measurement result to the base station at a moment n+k+k1 based on uplink resource information.

After obtaining the first measurement result, the UE may send, at the moment n+k+k1 based on the uplink resource information, the first measurement result including the target downlink beam pair set to the base station. In this way, after receiving the first measurement result, the base station may determine a third downlink beam pair set based on the received first measurement result. The third downlink beam pair set may be a beam pair set different from the target downlink beam pair set, may be a beam pair set the same as the target downlink beam pair set, or may be a set including some downlink beam pairs in the target downlink beam pair set. In this way, the UE may detect a third downlink channel at a moment n+k+k1+k2, to obtain information about the third downlink beam pair set, to subsequently communicate with the base station based on the information about the third downlink beam pair set. The base station may send, to the UE on the third downlink channel, the information about the third downlink beam pair set by using the target downlink beam pair set included in the first measurement result.

For example, as shown in FIG. 5, assuming that the target downlink beam pair determined by the UE is <B4, B4'>, the UE may send the first measurement result including information about the target downlink beam pair <B4, B4'> to the base station. After the base station determines the third downlink beam pair set based on the first measurement result, if a determined third downlink beam pair is <B4, B4'>, the base station may send information about the downlink beam pair <B4, B4'> to the UE. In this way, in subsequent communication, the base station may send downlink data to the UE by using the downlink beam pair <B4, B4'>.

That the UE detects the third downlink channel at the moment n+k+k1+k2, to obtain the information about the third downlink beam pair set may be specifically as follows: The UE performs blind detection on the third downlink channel at the moment n+k+k1+k2 based on N optimal target downlink beam pairs in the target downlink beam pair set in the first measurement result, to obtain the information about the third downlink beam pair set.

405b. The base station sends a first downlink signal to the UE by using a first target downlink beam pair set through a first downlink channel.

When the base station detects the first uplink signal and the detected first uplink signal is in the second type, the base station may learn that the first downlink beam pair set is invalid, and may learn of a downlink beam pair set recommended by the UE, namely, the first target downlink beam pair set. In this case, the base station may send the first downlink signal to the UE by using the first target downlink beam pair set through the first downlink channel. For example, as shown in FIG. 6, the base station sends the first downlink signal to the UE by using a downlink beam pair <B4, B4'> through the first downlink channel.

For example, beam information of each first target downlink beam pair in the first target downlink beam pair set is preconfigured in the base station. In this way, for each first target downlink beam pair, the base station may send the first downlink signal to the UE based on the preconfigured beam information of the first target downlink beam pair by using the first target downlink beam pair through the first downlink channel. The beam information may be QCL information. The beam information may include beam pair information, for example, include a beam pattern (pattern) corresponding to each OFDM symbol, or include an association between OFDM symbols and different CSI-RSs or QCLs of different CSI-SSs. For example, a first OFDM symbol is associated with a CSI-RS configuration (configuration) 1 corresponding to a beam 1, and a second OFDM symbol is associated with a CSI-RS configuration 2 corresponding to a beam 2.

406b. The UE detects, at a moment n+k, the first downlink signal sent by the base station by using the first target downlink beam pair set through the first downlink channel, to obtain a first detection result.

The UE may detect, at the moment n+k, the first downlink signal sent by the base station by using the first target downlink beam pair set through the first downlink channel, to obtain the first detection result. In addition, further, the UE may select a better downlink beam pair set from the first target downlink beam pair set and/or another downlink beam pair set based on the first detection result, and use the selected downlink beam pair set as a second target downlink beam pair set. The determined second target downlink beam pair set may include at least one target downlink beam pair. In this way, in subsequent communication, the base station may communicate with the UE by using the second target downlink beam pair set.

The second target downlink beam pair set may be the same as the first target downlink beam pair set, may be different from the first target downlink beam pair set, or may include some downlink beam pairs in the first target downlink beam pair set.

For example, as shown in FIG. 6, the UE measures the first downlink signal sent by the base station on the first downlink channel by using the downlink beam pair <B4, B4'>, and determines, based on a measurement result, that the downlink beam pair <B4, B4'> can be a second target downlink beam pair. In addition, in subsequent communication, the base station may send downlink data to the UE by using the downlink beam pair <B4, B4'>.

For example, step 406b may be implemented in three manners.

In a first possible implementation, the first downlink signal is a downlink control channel (NR-PDCCH), and the downlink control channel includes configuration information of a first measurement pilot. The UE may perform blind detection on the downlink control channel at the moment n+k based on the first target downlink beam pair set, to obtain the first measurement result. The first target downlink beam pair set is different from the first downlink beam pair set. That the UE performs blind detection on the downlink control channel at the moment n+k based on the first target downlink beam pair set, to obtain the first measurement result may be specifically as follows: The UE measures the first measurement pilot at the moment n+k based on the configuration information of the first measurement pilot, to obtain the first detection result. The first measurement pilot is a beam measurement pilot, and the first measurement result is information about the second target downlink beam pair set.

In a second possible implementation, the first downlink signal is a first measurement pilot, and configuration information of the first measurement pilot is preconfigured in the UE. The UE may perform blind detection on a downlink control channel at the moment n+k based on the first target downlink beam pair set, to obtain the first measurement result. The first target downlink beam pair set is different from the first downlink beam pair set. That the UE performs blind detection on a downlink control channel at the moment n+k based on the first target downlink beam pair set, to obtain the first measurement result may be specifically as follows: The UE measures the first measurement pilot based on the configuration information of the first measurement pilot, to obtain the first detection result. The first measurement pilot is a beam measurement pilot, and the first measurement result is information about the second target downlink beam pair set.

In a third possible implementation, the first downlink signal is a downlink control channel (NR-PDCCH). The UE may obtain the first measurement result at the moment n+k based on detection on the downlink control channel. The first measurement result is information about the second target downlink beam pair set.

In addition, further, the first downlink signal may include information about a third downlink beam pair set. In this case, after the UE detects, at the moment n+k, the first downlink signal sent by the base station by using the first target downlink beam pair set through the first downlink channel, to obtain the first detection result, the UE may further communicate with the base station based on the information about the third downlink beam pair set.

It should be noted that for corresponding descriptions of specific content in step 405b and step 406b in this embodiment of the present invention, refer to specific descriptions of corresponding content in step 405a to step 407a in this embodiment of the present invention. Details are not described herein again in this embodiment of the present invention.

405c. The UE determines that a first downlink signal is not detected at a moment n+k, and the UE resends the first uplink signal to the base station at a moment n+k+k1 by using a second uplink beam pair set through a second uplink channel.

When the base station does not detect the first uplink signal, the base station does not return response information, namely, the first downlink signal, to the UE. In this case, the UE determines that the first downlink signal is not detected at the moment n+k, and the UE may resend the first uplink signal to the base station by using the second uplink beam pair set through the second uplink channel. In this case, it is assumed that the first uplink signal is in the first type.

For example, as shown in FIG. 7, the UE resends the first uplink signal to the base station at the moment n+k through the second uplink channel by using an uplink beam pair <B8, B8'>, an uplink beam pair <B9, B9'>, an uplink beam pair <B10, B10'>, and an uplink beam pair <B11, B11'>. For example, beam information of each second uplink beam pair in the second uplink beam pair set is preconfigured in the UE. In this way, for each second uplink beam pair, the UE may resend the first uplink signal to the base station based on the preconfigured beam information of the second uplink beam pair by using the second uplink beam pair through the second uplink channel.

406c. The base station detects the first uplink signal sent by the UE by using the second uplink beam pair set through the second uplink channel, to obtain a second detection result, and determines a target uplink beam pair set based on the second detection result.

For each second uplink beam pair in the second uplink beam pair set, the base station may detect the first uplink signal sent by the UE by using the second uplink beam pair through the second uplink channel, to obtain the second detection result. In this case, the base station may select a better uplink beam pair from the second uplink beam pair set and/or another uplink beam pair set based on the second detection result, and use the selected uplink beam pair as a target uplink beam pair. There may be one or more determined target uplink beam pairs.

For example, as shown in FIG. 7, the base station separately measures first uplink signals sent by the base station on the second uplink channel by using the uplink beam pair <B8, B8'>, the uplink beam pair <B9, B9'>, the uplink beam pair <B10, B10'>, and the uplink beam pair <B11, B11'>; and selects a better uplink beam pair from the uplink beam pair <B8, B8'>, the uplink beam pair <B9, B9'>, the uplink beam pair <B10, B10'>, the uplink beam pair <B11, B11'>, and/or another uplink beam pair set based on the second measurement result, and uses the selected uplink beam pair as the target uplink beam pair. It is assumed that the target uplink beam pair determined by the base station is <B9, B9'>.

407c. The base station sends the first downlink signal to the UE by using a second downlink beam pair set through a first downlink channel.

The first downlink signal includes information about the target uplink beam pair.

408c. The UE detects, at a moment n+k+k1+k2, the first downlink signal sent by the base station by using the second downlink beam pair set through the first downlink channel, to obtain a first detection result.

The UE may detect, at the moment n+k+k1+k2, the first downlink signal sent by the base station by using the second downlink beam pair set through the first downlink channel, to obtain the first detection result. In addition, further, the UE may select a better downlink beam pair set from the second downlink beam pair set and/or another downlink beam pair set based on the first detection result, and use the selected downlink beam pair set as a target downlink beam pair set.

The determined target downlink beam pair set may include at least one target downlink beam pair. A downlink beam pair included in the target downlink beam pair set determined by the UE may belong to the second downlink beam pair set, or may not belong to the second downlink beam pair set.

For example, step 408c may be implemented in three manners.

In a first possible implementation, the first downlink signal is a downlink control channel (NR-PDCCH), and the downlink control channel includes configuration information of a first measurement pilot. The UE may perform blind detection on the downlink control channel at the moment n+k+k1+k2 based on the second downlink beam pair set, to obtain the first measurement result. The second downlink beam pair set is a preconfigured beam pair set used for beam recovery, and the second downlink beam pair set is different from the first downlink beam pair set. That the UE performs blind detection on the downlink control channel at the moment n+k+k1+k2 based on the second downlink beam pair set, to obtain the first measurement result may be specifically as follows: The UE measures the first measurement pilot at the moment n+k+k1+k2 based on the configuration information of the first measurement pilot, to obtain the first detection result. The first measurement pilot is a beam measurement pilot, and the first measurement result is information about the target downlink beam pair set.

In a second possible implementation, the first downlink signal is a first measurement pilot, and configuration information of the first measurement pilot is preconfigured in the UE. The UE may perform blind detection on a downlink control channel at the moment n+k+k1+k2 based on the second downlink beam pair set, to obtain the first measurement result. The second downlink beam pair set is a preconfigured beam pair set used for beam recovery, and the second downlink beam pair set is different from the first downlink beam pair set. That the UE performs blind detection on a downlink control channel at the moment n+k+k1+k2 based on the second downlink beam pair set, to obtain the first measurement result may be specifically as follows: The UE measures the first measurement pilot based on the configuration information of the first measurement pilot, to obtain the first detection result. The first measurement pilot is a beam measurement pilot, and the first measurement result is information about the target downlink beam pair set.

In a third possible implementation, the first downlink signal is a downlink control channel (NR-PDCCH). The UE may obtain the first measurement result at the moment n+k+k1+k2 based on detection on the downlink control channel. The first measurement result is information about the target downlink beam pair set.

In addition, further, the downlink control channel may include uplink resource information used to report the first measurement result. The uplink resource information includes an uplink time-frequency resource and/or information about the second uplink beam pair set. The second uplink beam pair set may be a beam pair set different from the first uplink beam pair set, may be a beam pair set the same as the first uplink beam pair set, or may be a set including some uplink beam pairs in the first uplink beam pair set.

409c. The UE sends the first measurement result to the base station at a moment n+k+k1+k2+k3 based on uplink resource information.

After determining the target downlink beam pair set, the UE may send, on a third uplink channel by using the target uplink beam pair determined in step 406c, the first measurement result including information about a target downlink beam pair to the base station. In this way, after receiving the first measurement result, the base station may learn of the information about the target downlink beam pair, to communicate with the UE in subsequent communication by using the target downlink beam pair.

It should be noted that for specific descriptions in step 405c to step 409c in this embodiment of the present invention, refer to specific descriptions of corresponding content in other steps in this embodiment of the present invention. Details are not described herein again in this embodiment of the present invention.

405d. The UE determines that a first downlink signal is not detected at a moment n+k, and the UE resends the first uplink signal to the base station at a moment n+k+k1 by using a second uplink beam pair set through a second uplink channel.

When the base station does not detect the first uplink signal, the base station does not return response information, namely, the first downlink signal, to the UE. In this case, the UE determines that the first downlink signal is not detected at the moment n+k, and the UE may resend the first uplink signal to the base station at the moment n+k+k1 by using the second uplink beam pair set through the second uplink channel. It is assumed that the first uplink signal is in the second type. To be specific, the first uplink signal includes information about a first target downlink beam pair set.

For example, beam information of each second uplink beam pair in the second uplink beam pair set is preconfigured in the UE. In this way, for each second uplink beam pair, the UE may resend the first uplink signal to the base station based on the preconfigured beam information of the second uplink beam pair by using the second uplink beam pair through the second uplink channel.

406d. The base station detects the first uplink signal sent by the UE by using the second uplink beam pair set through the second uplink channel, to obtain a second detection result, and determines a target uplink beam pair set based on the second detection result.

For each second uplink beam pair in the second uplink beam pair set, the base station may detect the first uplink signal sent by the UE by using the second uplink beam pair through the second uplink channel, to obtain the second detection result. In this case, the base station may select a better uplink beam pair from the second uplink beam pair set and/or another uplink beam pair set based on the second detection result, and use the selected uplink beam pair as a target uplink beam pair. There may be one or more determined target uplink beam pairs.

407d. The base station sends the first downlink signal to the UE by using a first target downlink beam pair set through a first downlink channel.

When the base station detects the first uplink signal and the detected first uplink signal is in the second type, the base station may learn that information about a first downlink beam pair is invalid, and may learn of information about a downlink beam pair recommended by the UE, namely, information about a first target downlink beam pair. In this case, the base station may send the first downlink signal to the UE on the first downlink channel by using the first target downlink beam pair. For example, as shown in FIG. 8, the base station sends the first downlink signal to the UE on the first downlink channel by using a downlink beam pair <B4, B4'>. The first downlink signal includes information about a second target uplink beam pair set.

408d. The UE detects, at a moment n+k+k1+k2, the first downlink signal sent by the base station by using the first target downlink beam pair set through the first downlink channel, to obtain a first detection result.

The UE may detect, at the moment n+k+k1+k2, the first downlink signal sent by the base station by using the first target downlink beam pair set through the first downlink channel, to obtain the first detection result. In addition, further, the UE may select a better downlink beam pair set from the first target downlink beam pair set and/or another downlink beam pair set based on the first detection result, and use the selected downlink beam pair set as a second target downlink beam pair set. The determined second target downlink beam pair set may include at least one target downlink beam pair. A downlink beam pair included in the second target downlink beam pair set determined by the UE may belong to the second downlink beam pair set, or may not belong to the second downlink beam pair set.

For example, step 408d may be implemented in three manners.

In a first possible implementation, the first downlink signal is a downlink control channel (NR-PDCCH), and the downlink control channel includes configuration information of a first measurement pilot. The UE may perform blind detection on the downlink control channel at the moment n+k+k1+k2 based on the first target downlink beam pair set, to obtain the first measurement result. The second downlink beam pair set is a preconfigured beam pair set used for beam recovery, and the first target downlink beam pair set is different from the first downlink beam pair set.

That the UE performs blind detection on the downlink control channel at the moment n+k+k1+k2 based on the first target downlink beam pair set, to obtain the first measurement result may be specifically as follows: The UE measures the first measurement pilot at the moment n+k+k1+k2 based on the configuration information of the first measurement pilot, to obtain the first detection result. The first measurement pilot is a beam measurement pilot, and the first measurement result is information about the second target downlink beam pair set.

In a second possible implementation, the first downlink signal is a first measurement pilot, and configuration information of the first measurement pilot is preconfigured in the UE. The UE may perform blind detection on a downlink control channel at the moment n+k+k1+k2 based on the first target downlink beam pair set, to obtain the first measurement result. The first target downlink beam pair set is a preconfigured beam pair set used for beam recovery, and the first target downlink beam pair set is different from the first downlink beam pair set.

That the UE performs blind detection on a downlink control channel at the moment n+k+k1+k2 based on the first target downlink beam pair set, to obtain the first measurement result may be specifically as follows: The UE measures the first measurement pilot based on the configuration information of the first measurement pilot, to obtain the first detection result. The first measurement pilot is a beam measurement pilot, and the first measurement result is information about the second target downlink beam pair set.

In a third possible implementation, the first downlink signal is a downlink control channel (NR-PDCCH). The UE may obtain the first measurement result at the moment n+k+k1+k2 based on detection on the downlink control channel. The first measurement result is information about the second target downlink beam pair set.

409d. The UE sends the first measurement result to the base station at a moment n+k+k1+k2+k3 based on uplink resource information.

For example, as shown in FIG. 8, assuming that the target uplink beam pair determined by the base station is <B5, B5'>, the UE may send the first measurement result to the base station based on the uplink resource information by using the target uplink beam pair <B5, B5'>.

In addition, in this embodiment of the present invention, the first uplink channel is a periodic PUCCH, and periodic PUCCH is further used to transmit information such as a HARQ, CSI information, beam information, and SR information. The second uplink channel is a preconfigured uplink channel specifically used for beam recovery, and an uplink beam configured for the second uplink channel is a beam pair specially used for uplink beam recovery, and is different from an uplink beam pair configured for the first uplink channel (a first beam pair is a beam pair configured for a periodic uplink control channel). The second uplink channel is a channel in a same timeslot as an RACH.

It should be noted that for corresponding descriptions of specific content in step 405d to step 409d in this embodiment of the present invention, refer to specific descriptions of corresponding content in other steps in this embodiment of the present invention. Details are not described herein again in this embodiment of the present invention. In addition, n, k, k1, k2, k3, and k4 in this embodiment of the present invention each are a positive integer.

In addition, it should be noted that in this embodiment of the present invention, when the UE does not detect the first downlink signal at the moment n+k, the UE resends the first uplink signal to the base station at the moment n+k+k1, to notify the base station that the first downlink beam pair set is invalid. Certainly, when detecting that the first downlink beam pair set is invalid, the UE may send the first uplink signal to the base station at the moment n by using the second uplink beam pair set through the second uplink channel.

In the link re-establishment method provided in this embodiment of the present invention, when detecting that the first downlink beam pair set is invalid, the UE sends, to the base station at the moment n by using the first uplink beam pair set through the first uplink channel, the first uplink signal used to notify the base station that the first downlink beam pair set is invalid; and detects, at the moment n+k, the first downlink signal sent by the base station by using the second downlink beam pair set through the first downlink channel, to obtain the first detection result, where the first downlink signal is used to acknowledge that the base station receives the first uplink signal. The UE sends, to the base station, the first uplink signal used to notify the base station that the first downlink beam pair set is invalid, so that the base station can send the first downlink signal by using the second downlink beam pair set through the first downlink channel. In this way, a link can be recovered through negotiation between the base station and the UE, to resolve a problem that communication is interrupted in a process of communication between the base station and the UE because data cannot continue to be transmitted due to a block.

The foregoing mainly describes the solutions provided in the embodiments of the present invention from the perspective of interaction between network elements. It may be understood that, to implement the foregoing functions, each network element, for example, the base station or the UE, includes corresponding hardware structures and/or software modules for performing the functions. A person skilled in the art should be easily aware that, the algorithm steps in the examples described with reference to the embodiments disclosed in this specification can be implemented by hardware or a combination of hardware and computer software in the present invention. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the base station and the UE may be divided into functional modules according to the foregoing method examples. For example, each functional module may be obtained through division for each function, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner during actual implementation.

Figure 9:
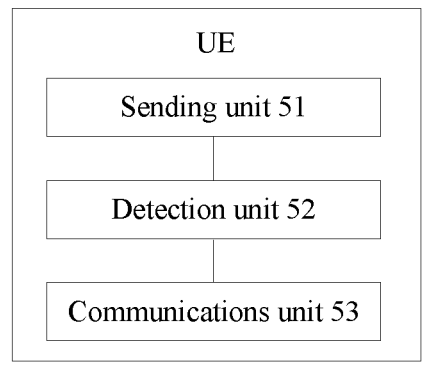
FIG. 9 is a schematic composition diagram of another UE according to an embodiment of the present invention.

When each functional module is obtained through division for each function, FIG. 9 is a possible schematic composition diagram of UE in the foregoing embodiment. As shown in FIG. 9, the UE may include a sending unit 51 and a detection unit 52.

The sending unit 51 is configured to support the UE in performing steps 403 and 407a in the method shown in FIG. 4A, step 403 in the method shown in FIG. 4B, steps 403, 405c, and 409c in the method shown in FIG. 4C, and steps 403, 405d, and 409d in the method shown in FIG. 4D.

The detection unit 52 is configured to support the UE in performing steps 402 and 406a in the method shown in FIG. 4A, steps 402 and 406b in the method shown in FIG. 4B, steps 402 and 408c in the method shown in FIG. 4C, and steps 402 and 408d in the method shown in FIG. 4D.

In this embodiment of the present invention, further, as shown in FIG. 9, the UE may include a communications unit 53.

The communications unit 53 is configured to support the UE in performing operations for communication between the base station and the UE in the method shown in FIG. 4A, FIG. 4B, FIG. 4C, and FIG. 4D.

It should be noted that all related content of steps in the foregoing method embodiments may be cited in function descriptions of corresponding functional modules. Details are not described herein again.

The UE provided in this embodiment of the present invention is configured to perform the foregoing link re-establishment method, and therefore an effect the same as that of the foregoing link re-establishment method can be achieved.

Figure 10:
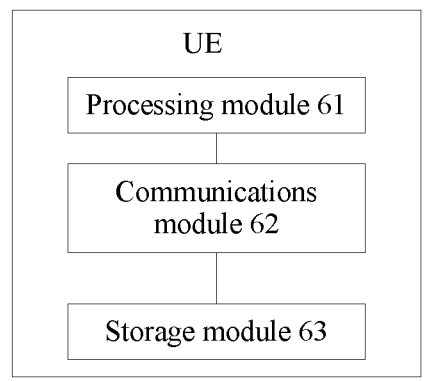
FIG. 10 is a schematic composition diagram of another UE according to an embodiment of the present invention.

When an integrated unit is used, FIG. 10 is another possible schematic composition diagram of UE in the foregoing embodiment. As shown in FIG. 10, the UE includes a processing module 61 and a communications module 62.

The processing module 61 is configured to control and manage an action of the UE. For example, the processing module 61 is configured to support the UE in performing steps 402 and 406a in the method shown in FIG. 4A, steps 402 and 406b in the method shown in FIG. 4B, steps 402 and 408c in the method shown in FIG. 4C, and steps 402 and 408d in the method shown in FIG. 4D, and/or performing another process of the technology described in this specification.

The communications module 62 is configured to support communication between the UE and another network entity, for example, communication between the UE and a functional module or a network entity shown in FIG. 1, FIG. 2, FIG. 11, or FIG. 12. For example, the communications module 62 is configured to support the UE in performing steps 403 and 407a in the method shown in FIG. 4A, step 403 in the method shown in FIG. 4B, steps 403, 405c, and 409c in the method shown in FIG. 4C, and steps 403, 405d, and 409d in the method shown in FIG. 4D. The UE may further include a storage module 63, configured to store program code and data of the UE.

The processing module 61 may be a processor or a controller. The processing module 61 may implement or execute various example logical blocks, modules, and circuits that are described with reference to the content disclosed in the present invention. The processor may also be a combination that implements a computing function, for example, a combination of one or more microprocessors or a combination of a DSP and a microprocessor. The communications module 62 may be a transceiver, a transceiver circuit, a communications interface, or the like. The storage module 63 may be a memory.

When the processing module 61 is a processor, the communications module 62 is a transceiver, and the storage module 63 is a memory, the UE in this embodiment of the present invention may be the UE shown in FIG. 3.

Figure 11:
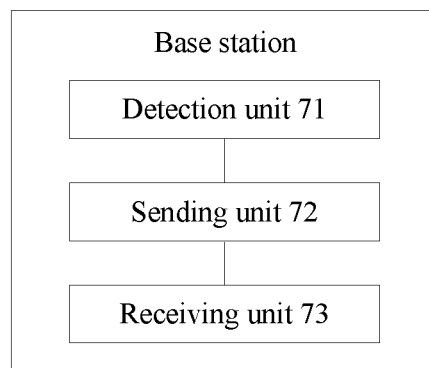
FIG. 11 is a schematic composition diagram of another base station according to an embodiment of the present invention.

When each functional module is obtained through division for each function, FIG. 11 is a possible schematic composition diagram of a base station in the foregoing embodiment. As shown in FIG. 11, the base station may include a detection unit 71 and a sending unit 72.

The detection unit 71 is configured to support the base station in performing step 404 in the method shown in FIG. 4A, step 404 in the method shown in FIG. 4B, steps 404 and 406c in the method shown in FIG. 4C, and steps 404 and 406d in the method shown in FIG. 4D.

The sending unit 72 is configured to support the base station in performing steps 401 and 405a in the method shown in FIG. 4A, steps 401 and 405b in the method shown in FIG. 4B, steps 401 and 407c in the method shown in FIG. 4C, and steps 401 and 407d in the method shown in FIG. 4D.

Further, as shown in FIG. 11, the base station may include a receiving unit 73.

The receiving unit 73 is configured to support the base station in performing receiving operations in the method shown in FIG. 4A, FIG. 4B, FIG. 4C, and FIG. 4D.

It should be noted that all related content of steps in the foregoing method embodiments may be cited in function descriptions of corresponding functional modules. Details are not described herein again.

The base station provided in this embodiment of the present invention is configured to perform the foregoing link recovery method, and therefore an effect the same as that of the foregoing link recovery method can be achieved.

Figure 12:
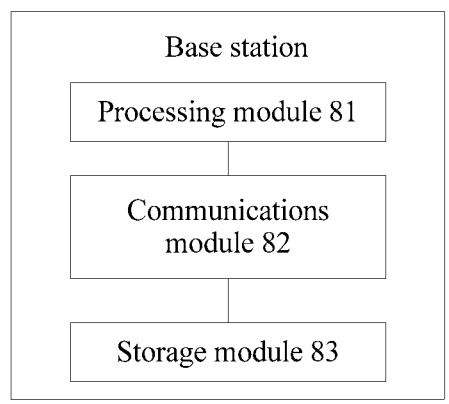
FIG. 12 is a schematic composition diagram of another base station according to an embodiment of the present invention.

When an integrated unit is used, FIG. 12 is another possible schematic composition diagram of a base station in the foregoing embodiment. As shown in FIG. 11, the base station includes a processing module 81 and a communications module 82.

The processing module 81 is configured to control and manage an action of the base station. For example, the processing module 81 is configured to support the base station in performing step 404 in the method shown in FIG. 4A, step 404 in the method shown in FIG. 4B, steps 404 and 406c in the method shown in FIG. 4C, and steps 404 and 406d in the method shown in FIG. 4D.

The communications module 82 is configured to support communication between the base station and another network entity, for example, communication between the base station and a functional module or a network entity shown in FIG. 1, FIG. 3, FIG. 9, or FIG. 10. For example, the communications module 82 is configured to support the base station in performing steps 401 and 405a in the method shown in FIG. 4A, steps 401 and 405b in the method shown in FIG. 4B, steps 401 and 407c in the method shown in FIG. 4C, and steps 401 and 407d in the method shown in FIG. 4D. The base station may further include a storage module 83, configured to store program code and data of the base station.

The processing module 81 may be a processor or a controller. The processing module 81 may implement or execute various example logical blocks, modules, and circuits that are described with reference to the content disclosed in the present invention. The processor may also be a combination that implements a computing function, for example, a combination of one or more microprocessors or a combination of a DSP and a microprocessor.

The communications module 82 may be a transceiver, a transceiver circuit, a communications interface, or the like. The storage module 83 may be a memory.

When the processing module 81 is a processor, the communications module 82 is a transceiver, and the storage module 83 is a memory, the base station in this embodiment of the present invention may be the base station shown in FIG. 2.

An embodiment of this application further provides another link re-establishment method. The method includes: sending, by UE when detecting that a first downlink beam pair set is invalid, a first uplink signal to a base station at a moment n by using a first uplink beam pair set through a first uplink channel, where the first uplink signal is used to notify the base station that the first downlink beam pair set is invalid; and detecting, by the UE at a moment n+k, a first downlink signal sent by the base station by using a second downlink beam pair set through a first downlink channel, to obtain a first detection result, where the first downlink signal is used to acknowledge that the base station receives the first uplink signal.

Further, optionally, in some embodiments of this application, the first downlink signal is determined based on content included in the first uplink signal.

Further, optionally, in some embodiments of this application, the first uplink signal is a beam failure report or a beam recovery request, the first uplink signal includes information about a first target downlink beam pair set, the second downlink beam pair set is the first target downlink beam pair set, and the first downlink signal is a downlink control channel NR-PDCCH or a first measurement pilot. The detecting, by the UE at a moment n+k, a first downlink signal sent by the base station by using a second downlink beam pair set through a first downlink channel, to obtain a first detection result may include: performing, by the UE, blind detection on the downlink control channel at the moment n+k based on the first target downlink beam pair set, to obtain the first detection result, where the first target downlink beam pair set is different from the first downlink beam pair set, and the first target downlink beam pair set includes a downlink beam.

The foregoing descriptions of implementations allow a person skilled in the art to understand that, for the purpose of convenient and brief description, division of the foregoing functional modules is merely taken as an example for illustration. During actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of the present invention essentially, or the part contributing to the prior art, or all or some of the technical solutions may be implemented in the form of a software product. The software product is stored in a storage medium and includes several instructions for enabling a device (which may be a single-chip microcomputer, a chip, or the like) or a processor (processor) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement disclosed within the technical scope of the present invention shall fall within the protection scope of the present invention. Therefore, the protection scope of the present invention shall be subject to the protection scope of the claims.

What is claimed is:

1. A link re-establishment method, comprising:
sending, by user equipment (UE) when detecting that a first downlink beam pair set is invalid, a first uplink signal to a base station at a first moment by using a first uplink beam pair set through a first uplink channel, wherein the first uplink signal notifies the base station that the first downlink beam pair set is invalid; and
detecting, by the UE at a second moment, a first downlink signal sent by the base station by using a second downlink beam pair set through a first downlink channel, to obtain a first detection result, wherein the first downlink signal acknowledges that the base station receives the first uplink signal, and the first downlink signal is determined based on content indicated by the first uplink signal, wherein the first uplink signal is a beam failure report or a beam recovery request, the first downlink signal is a downlink control channel (NR-PDCCH) or a first measurement pilot, and wherein at least one of the following occurs:
the detecting comprises: performing, by the UE, blind detection on the downlink control channel at the second moment based on the second downlink beam pair set, to obtain the first detection result, wherein the second downlink beam pair set is a preconfigured beam pair set used for beam recovery, and the second downlink beam pair set is different from the first downlink beam pair set; or
the first uplink signal comprises information about a first target downlink beam pair set, and the second downlink beam pair set is the first target downlink beam pair set, and the detecting comprises: performing, by the UE, blind detection on the downlink control channel at the second moment based on the first target downlink beam pair set, to obtain the first detection result, wherein the first target downlink beam pair set is different from the first downlink beam pair set.

2. The method according to claim 1, wherein
when the first downlink signal is the downlink control channel, the downlink control channel comprises configuration information of the first measurement pilot; or
when the first downlink signal is the first measurement pilot, configuration information of the first measurement pilot is preconfigured in the UE; and
the performing, by the UE, blind detection on the downlink control channel at the second moment based on the second downlink beam pair set, to obtain the first detection result comprises:
measuring, by the UE, the first measurement pilot based on the configuration information of the first measurement pilot, to obtain the first detection result, wherein the first measurement pilot is a beam measurement pilot, and the first detection result is information about a target downlink beam pair set.

3. A link re-establishment method, comprising:
detecting, by a base station, a first uplink signal on a first uplink channel by using a first uplink beam pair set, wherein the first uplink signal notifies the base station that a first downlink beam pair set is invalid; and
sending, by the base station, a first downlink signal to a UE by using a second downlink beam pair set through a first downlink channel, wherein the first downlink signal acknowledges that the base station receives the first uplink signal, and the first downlink signal is determined based on content indicated by the first uplink signal, wherein the first uplink signal is a beam failure report or a beam recovery request, the first uplink signal comprises information about a first target downlink beam pair set, and the second downlink beam pair set is the first target downlink beam pair set.

4. The method according to claim 3, wherein the first downlink signal is a downlink control channel (NR-PDCCH) or a first measurement pilot; and when the first downlink signal is the downlink control channel, the downlink control channel comprises configuration information of the first measurement pilot.

5. User equipment (UE), comprising:
a transmitter,
at least one processor; and
one or more memories coupled to the at least one processor and storing programming instructions for execution by the at least one processor to cause the UE to:
when detecting that a first downlink beam pair set is invalid, send, by using the transmitter, a first uplink signal to a base station at a first moment by using a first uplink beam pair set through a first uplink channel, wherein the first uplink signal notifies the base station that the first downlink beam pair set is invalid; and
detect, at a second moment, a first downlink signal sent by the base station by using a second downlink beam pair set through a first downlink channel, to obtain a first detection result, wherein the first downlink signal acknowledges that the base station receives the first uplink signal, and the first downlink signal is determined based on content indicated by the first uplink signal, wherein the first uplink signal is a beam failure report or a beam recovery request, the first downlink signal is a downlink control channel (NR-PDCCH) or a first measurement pilot, and wherein at least one of the following occurs:
the programming instructions, when executed by the at least one processor, cause the UE to perform blind detection on the downlink control channel at the second moment based on the second downlink beam pair set, to obtain the first detection result, wherein the second downlink beam pair set is a preconfigured beam pair set used for beam recovery, and the second downlink beam pair set is different from the first downlink beam pair set; or
the first uplink signal comprises information about a first target downlink beam pair set, and the second downlink beam pair set is the first target downlink beam pair set, and the programming instructions, when executed by the at least one processor, cause the UE to perform blind detection on the downlink control channel at the second moment based on the first target downlink beam pair set, to obtain the first detection result, wherein the first target downlink beam pair set is different from the first downlink beam pair set.

6. The UE according to claim 5, wherein when the first downlink signal is the downlink control channel, the downlink control channel comprises configuration information of the first measurement pilot; or when the first downlink signal is the first measurement pilot, configuration information of the first measurement pilot is preconfigured in the UE; and
the programming instructions, when executed by the at least one processor, cause the UE to:
measure the first measurement pilot based on the configuration information of the first measurement pilot, to obtain the first detection result, wherein the first measurement pilot is a beam measurement pilot, and the first detection result is information about a target downlink beam pair set.

7. A base station, comprising:
a transmitter,
at least one processor; and
one or more memories coupled to the at least one processor and storing programming instructions for execution by the at least one processor to cause the base station to:
detect a first uplink signal on a first uplink channel by using a first uplink beam pair set, wherein the first uplink signal notifies the base station that a first downlink beam pair set is invalid; and
send, by using the transmitter, a first downlink signal to a UE by using a second downlink beam pair set through a first downlink channel, wherein the first downlink signal acknowledges that the base station receives the first uplink signal, and the first downlink signal is determined based on content indicated by the first uplink signal, wherein the first uplink signal is a beam failure report or a beam recovery request, the first uplink signal comprises information about a first target downlink beam pair set, and the second downlink beam pair set is the first target downlink beam pair set.

8. The base station according to claim 7, wherein the first downlink signal is a downlink control channel (NR-PDCCH) or a first measurement pilot; and
when the first downlink signal is the downlink control channel, the downlink control channel comprises configuration information of the first measurement pilot.

9. A non-transitory computer-readable storage medium, comprising a computer program, wherein when the computer program is run on a computer, the computer is enabled to perform:
sending, by user equipment (UE) when detecting that a first downlink beam pair set is invalid, a first uplink signal to a base station at a first moment by using a first uplink beam pair set through a first uplink channel, wherein the first uplink signal notifies the base station that the first downlink beam pair set is invalid; and
detecting, by the UE at a second moment, a first downlink signal sent by the base station by using a second downlink beam pair set through a first downlink channel, to obtain a first detection result, wherein the first downlink signal acknowledges that the base station receives the first uplink signal, and the first downlink signal is determined based on content indicated by the first uplink signal, wherein the first uplink signal is a beam failure report or a beam recovery request, the first downlink signal is a downlink control channel (NR-PDCCH) or a first measurement pilot, and wherein at least one of the following occurs:
the detecting comprises: performing, by the UE, blind detection on the downlink control channel at the second moment based on the second downlink beam pair set, to obtain the first detection result, wherein the second downlink beam pair set is a preconfigured beam pair set used for beam recovery, and the second downlink beam pair set is different from the first downlink beam pair set; or
the first uplink signal comprises information about a first target downlink beam pair set, and the second downlink beam pair set is the first target downlink beam pair set, and the detecting comprises: performing, by the UE, blind detection on the downlink control channel at the second moment based on the first target downlink beam pair set, to obtain the first detection result, wherein the first target downlink beam pair set is different from the first downlink beam pair set.

10. A non-transitory computer-readable storage medium, comprising a computer program, wherein when the computer program is run on a computer, the computer is enabled to perform:

detecting, by a base station, a first uplink signal on a first uplink channel by using a first uplink beam pair set, wherein the first uplink signal notifies the base station that a first downlink beam pair set is invalid; and sending, by the base station, a first downlink signal to a UE by using a second downlink beam pair set through a first downlink channel, wherein the first downlink signal acknowledges that the base station receives the first uplink signal, and the first downlink signal is determined based on content indicated by the first uplink signal, wherein the first uplink signal is a beam failure report or a beam recovery request, the first uplink signal comprises information about a first target downlink beam pair set, and the second downlink beam pair set is the first target downlink beam pair set.

\* \* \* \* \*

UNITED STATES PATENT AND TRADEMARK OFFICE
CERTIFICATE OF CORRECTION

PATENT NO. : 11,265,741 B2
APPLICATION NO. : 16/581553
DATED : March 1, 2022
INVENTOR(S) : Kunpeng Liu, Xueru Li and Lixia Xue It is certified that error appears in the above-identified patent and that said Letters Patent is hereby corrected as shown below:

In the Specification

In Column 1 Line 10 (approx.), delete "2017, The" and insert --2017. The--.

Signed and Sealed this
Seventh Day of June, 2022

Katherine Kelly Vidal
*Director of the United States Patent and Trademark Office*